(12) United States Patent
Zhang

(10) Patent No.: US 12,063,628 B2
(45) Date of Patent: Aug. 13, 2024

(54) METHOD AND DEVICE IN NODES USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI TUILUO COMMUNICATION TECHNOLOGY PARTNERSHIP (LIMITED PARTNERSHIP), Shanghai (CN)

( * ) Notice: Subject to any disclaimer, the term of this patent is extended or adjusted under 35 U.S.C. 154(b) by 303 days.

(21) Appl. No.: 17/574,587

(22) Filed: Jan. 13, 2022

(65) Prior Publication Data

US 2022/0225287 A1 Jul. 14, 2022

(30) Foreign Application Priority Data

Jan. 14, 2021 (CN) .......................... 202110048194.2
Feb. 4, 2021 (CN) .......................... 202110153167.1
Nov. 9, 2021 (CN) .......................... 202111316924.9

(51) Int. Cl.
*H04W 72/02* (2009.01)
*H04L 1/1812* (2023.01)
*H04W 72/0446* (2023.01)
*H04W 72/0453* (2023.01)
*H04W 72/56* (2023.01)

(52) U.S. Cl.
CPC .......... *H04W 72/02* (2013.01); *H04L 1/1812* (2013.01); *H04W 72/0446* (2013.01); *H04W 72/0453* (2013.01); *H04W 72/56* (2023.01)

(58) Field of Classification Search
CPC .......... H04W 72/1268; H04W 72/569; H04W 72/21; H04W 72/542; H04W 72/23; H04W 72/044; H04L 1/1864; H04L 1/1812; H04L 1/1835; H04L 1/1822; H04L 1/1874; H04L 5/0053; H04L 5/0055; H04L 5/0091; H04L 1/1861; H04L 5/001
See application file for complete search history.

(56) References Cited

U.S. PATENT DOCUMENTS

| | | | | |
|---|---|---|---|---|
| 11,363,627 B2 * | 6/2022 | Cirik | ..................... | H04L 5/0078 |
| 11,477,792 B2 * | 10/2022 | Zhou | ..................... | H04L 1/1854 |
| 11,496,272 B2 * | 11/2022 | Chen | ..................... | H04L 1/1861 |
| 11,824,815 B2 * | 11/2023 | Yi | ..................... | H04B 7/088 |
| 11,831,438 B2 * | 11/2023 | Noh | ..................... | H04L 1/1864 |
| 11,832,285 B2 * | 11/2023 | Park | ..................... | H04L 5/0053 |
| 11,844,147 B2 * | 12/2023 | Noh | ..................... | H04L 5/0092 |

(Continued)

*Primary Examiner* — Jung Liu

(57) ABSTRACT

The present disclosure provides a method and a device in a node used for wireless communications: a first receiver, receiving a first signaling group and a second signaling group; and a first transceiver, transmitting a first signal, or, receiving a first signal in a first time-frequency resource pool; herein, the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set.

20 Claims, 6 Drawing Sheets

(56) References Cited

U.S. PATENT DOCUMENTS

| | | | |
|---|---|---|---|
| 2022/0217760 A1* | 7/2022 | Iyer | H04L 5/0053 |
| 2022/0225361 A1* | 7/2022 | Lee | H04W 72/1268 |
| 2022/0279505 A1* | 9/2022 | Jung | H04L 5/0055 |
| 2022/0279538 A1* | 9/2022 | Jung | H04L 5/0044 |
| 2022/0294591 A1* | 9/2022 | Liu | H04L 1/1864 |
| 2023/0318761 A1* | 10/2023 | Jang | H04W 72/1263 370/329 |
| 2023/0389100 A1* | 11/2023 | Guo | H04B 17/336 |

\* cited by examiner

METHOD AND DEVICE IN NODES USED FOR WIRELESS COMMUNICATION

CROSS REFERENCE TO RELATED APPLICATIONS

This application claims the priority benefit of Chinese Patent Application No. 202110048194.2, filed on Jan. 14, 2021, and the priority of benefit of Chinese Patent Application No. 202110153167.1, filed on Feb. 4, 2021, and the priority of benefit of Chinese Patent Application No. 202111316924.9, filed on Nov. 9, 2021, the full disclosure of which is incorporated herein by reference.

BACKGROUND

Technical Field

The present disclosure relates to transmission methods and devices in wireless communication systems, and in particular to a method and device for radio signal transmission in a wireless communication system supporting cellular networks.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

Multi-antenna (such as Multiple Input Multiple Output, abbreviated as MIMO), Multi-Transmission Reception Point (Multi-TRP) and Multi-Panel techniques are important and integral parts of NR technology; to adapt to more diverse application scenarios and meet higher demands, the 3GPP has agreed upon the enhancement in MIMO to support scenarios with better robustness and spectrum efficiency.

For wireless communications in high-frequency band, for instance, a band between 52.6 GHz and 71 GHz, the 3GPP introduces a single Downlink Control Information (DCI) format in NR Release 17 for scheduling multiple Physical Downlink Shared CHannels (PDSCHs)/Physical Uplink Shared CHannels (PUSCHs).

SUMMARY

In multi-TRP communications, multiple TRPs can be used to serve a same UE to enhance the robustness of communications or to increase transmission rate. The 3GPP is supportive to multi-TRP transmissions in a downlink data channel in Release 16 and agrees upon further support to multi-TRP-based Physical Uplink Shared CHannel (PUSCH) transmission with Configured Grant (CG). When multiple Configured Grants are used for transmission of repetitions of a Transport Block (1B), how to determine a corresponding Hybrid Automatic Repeat reQuest ACKnowledgement (HARQ) Process ID/number becomes a key issue to be solved.

When it comes to the scenario in which a DCI format schedules multiple PDSCHs/PUSCHs, how to determine the relationship between the scheduled PDSCHs/PUSCHs and the HARQ Process ID/number becomes a key issue to be solved.

To address the above problem, the present disclosure provides a solution. In the statement above, only the scenarios in which multi-TRP and single DCI format for scheduling multiple PDSCHs/PUSCHs are adopted have been presented for example; the present disclosure is also applicable to transmission scenarios like single-TRP, Internet of Things (IoT), Multicast and Broadcast Services (MBS), V2X, non-terrestrial networks (NTN), Ultra Reliable and Low Latency Communication (URLLC) and Extended Reality (XR), where similar technical effects can be achieved. Additionally, the adoption of a unified solution for various scenarios, including but not limited to single DCI for scheduling multiple PDSCHs/PUSCHs, multi-TRP, single-TRP, IoT, MBS, V2X, NTN, URLLC, or XR, contributes to the reduction of hardcore complexity and costs. It should be noted that if no conflict is incurred, embodiments in a User Equipment (UE) in the present disclosure and the characteristics of the embodiments are also applicable to a base station, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first signaling group and a second signaling group; and transmitting a first signal in a first time-frequency resource pool, or, receiving a first signal in a first time-frequency resource pool;

herein, the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set.

In one embodiment, the above method is advantageous in better supporting usage of multiple different Configured Grants (CGs), or, SPS configurations in transmitting (multiple repetitions of) a same TB.

In one embodiment, the above method is advantageous in avoiding misunderstandings on both sides of communications on the HARQ process ID/number.

In one embodiment, the above method is advantageous in improving the communication reliability.

In one embodiment, the above method is advantageous in avoiding the use of a single CG (or, SPS configuration) to support more complicated protocol changes required for multiple repetitions of transmission of different TRPs, hence better compatibility.

In one embodiment, the above method is advantageous in being beneficial to reducing signaling overhead.

According to one aspect of the present disclosure, the above method is characterized in that, the second signaling group is used to determine a second time-frequency resource pool, the first time-frequency resource pool being associated with the second time-frequency resource pool, time-domain resources occupied by the second time-frequency resource pool are used to determine the second numerical value.

According to one aspect of the present disclosure, the above method is characterized in that, the first signaling group is used to determine the first numerical value set; time-domain resources occupied by the first time-frequency resource pool are used to determine a first numerical value, the first numerical value belonging to the first numerical value set; the first numerical value and the second numerical value are associated.

According to one aspect of the present disclosure, the above method is characterized in that, first information indicates a first difference, and a difference between the first numerical value and the second numerical value is equal to the first difference.

In one embodiment, characteristics of the above method include: numerical values in the first numerical value set are being associated with numerical values in the second numerical value set.

According to one aspect of the present disclosure, the above method is characterized in comprising:

transmitting a second signal in a second time-frequency resource pool, or receiving a second signal in a second time-frequency resource pool;

herein, the first signal and the second signal both carry a first bit block, and the first time-frequency resource pool and the second time-frequency resource pool are respectively used for transmitting two repetitions of the first bit block; the second signaling group is used to determine a second time-frequency resource pool sub-group, with the second time-frequency resource pool being a time-frequency resource pool in the second time-frequency resource pool sub-group; any time-frequency resource pool in the second time-frequency resource pool sub-group corresponds to the second numerical value.

According to one aspect of the present disclosure, the above method is characterized in that, a HARQ process number corresponding to the first signal is equal to the second numerical value, the first signal and the second signal corresponding to a same HARQ process number.

According to one aspect of the present disclosure, the above method is characterized in that, a first multicarrier symbol occupied by a second time-frequency resource pool is used to determine a first reference numerical value, the first reference numerical value being equal to the second numerical value.

According to one aspect of the present disclosure, the above method is characterized in that, a HARQ process number corresponding to the first signal is equal to the second numerical value.

According to one aspect of the present disclosure, the above method is characterized in that, a numerical value in the first numerical value set corresponds to a HARQ process number, and a numerical value in the second numerical value set corresponds to a HARQ process number.

According to one aspect of the present disclosure, the above method is characterized in that, the first index and the second index respectively indicate different priorities.

The present disclosure provides a method in a second node for wireless communications, comprising:

transmitting a first signaling group and a second signaling group; and receiving a first signal in a first time-frequency resource pool, or, transmitting a first signal in a first time-frequency resource pool;

herein, the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set.

According to one aspect of the present disclosure, the above method is characterized in that, the second signaling group is used to determine a second time-frequency resource pool, the first time-frequency resource pool being associated with the second time-frequency resource pool, time-domain resources occupied by the second time-frequency resource pool are used to determine the second numerical value.

According to one aspect of the present disclosure, the above method is characterized in that, the first signaling group is used to determine the first numerical value set; time-domain resources occupied by the first time-frequency resource pool are used to determine a first numerical value, the first numerical value belonging to the first numerical value set; the first numerical value and the second numerical value are associated.

According to one aspect of the present disclosure, the above method is characterized in that, first information indicates a first difference, and a difference between the first numerical value and the second numerical value is equal to the first difference.

According to one aspect of the present disclosure, the above method is characterized in comprising:

receiving a second signal in a second time-frequency resource pool, or transmitting a second signal in a second time-frequency resource pool;

herein, the first signal and the second signal both carry a first bit block, and the first time-frequency resource pool and the second time-frequency resource pool are respectively used for transmitting two repetitions of the first bit block; the second signaling group is used to determine a second time-frequency resource pool sub-group, with the second time-frequency resource pool being a time-frequency resource pool in the second time-frequency resource pool sub-group; any time-frequency resource pool in the second time-frequency resource pool sub-group corresponds to the second numerical value.

According to one aspect of the present disclosure, the above method is characterized in that, a HARQ process number corresponding to the first signal is equal to the second numerical value, the first signal and the second signal corresponding to a same HARQ process number.

According to one aspect of the present disclosure, the above method is characterized in that, a first multicarrier symbol occupied by a second time-frequency resource pool is used to determine a first reference numerical value, the first reference numerical value being equal to the second numerical value.

According to one aspect of the present disclosure, the above method is characterized in that, a HARQ process number corresponding to the first signal is equal to the second numerical value.

According to one aspect of the present disclosure, the above method is characterized in that, a numerical value in the first numerical value set corresponds to a HARQ process number, and a numerical value in the second numerical value set corresponds to a HARQ process number.

According to one aspect of the present disclosure, the above method is characterized in that, the first index and the second index respectively indicate different priorities.

The present disclosure provides a first node for wireless communications, comprising:

a first receiver, receiving a first signaling group and a second signaling group; and a first transceiver, transmitting a first signal in a first time-frequency resource pool, or, receiving a first signal in a first time-frequency resource pool;

herein, the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set.

The present disclosure provides a second node for wireless communications, comprising:

a second transmitter, transmitting a first signaling group and a second signaling group; and a second transceiver, receiving a first signal in a first time-frequency resource pool, or, transmitting a first signal in a first time-frequency resource pool;

herein, the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set.

In one embodiment, the method in the present disclosure has the following advantages:

- avoiding misunderstandings of the HARQ process number by both sides of communications;
- better supporting usage of multiple different Configured Grants (CGs), or, SPS configurations in transmitting (multiple repetitions of) a same TB;
- improving the reliability of communications;
- avoiding the use of a single CG (or, SPS configuration) to support more complicated protocol changes required for multiple repetitions of transmission of different TRPs;
- being easily compatible;
- making it easier to associate different CGs (or, SPS configurations) in a flexible manner;
- being beneficial to the implementation of multi-TRP transmission;
- being beneficial to reduction in signaling overhead.

Related Art II

In the 5G system, Enhance Mobile Broadband (ebb) and Ultra Reliable and Low Latency Communication (URLLC) are two typical service types. Targeting the request for a lower target BLER (i.e., $10^{-5}$) in URLLC services, the 3rd Generation Partner Project (3GPP) has defined a new Modulation and Coding Scheme (MCS) in New Radio (NR) Release 15. To support more demanding URLLC traffics, for instance, with higher reliability (e.g., the target BLER is $10^{-6}$), lower latency (e.g., 0.5-1 ms) and so on, a Downlink Control Information (DCI) signaling can, as defined in the 3GPP NR Release 16, indicate whether services being scheduled is of Low Priority or High Priority, where the Low Priority is for URLLC services while the High Priority is for eMBB services. When a transmission of Low Priority is overlapping with a transmission of High Priority, the High-priority transmission is performed and the Low-priority one is dropped.

A Work Item (WI) of URLLC advancement in NR Release 17 was approved by the 3GPP RAN Plenary. The WI is proceeded with a focus of study on the Multiplexing of different intra-User-Equipment (Intra-UE) services.

SUMMARY II

After introducing Intra-UE Multiplexing of services of different priorities, how to multiplex Uplink Control Information (UCI) of high and low priorities (such as Hybrid Automatic Repeat reQuest ACKnowledgement (HARQ-ACK)) onto a Physical Uplink Control CHannel (PUCCH) for transmission becomes a key issue to be solved.

To address the above problem, the present disclosure provides a solution. The statement above only took Uplink (UL) for example; but the present disclosure also applies to Downlink (DL) and Sidelink (SL) transmission scenarios, where similar technical effect can be achieved. Additionally, the adoption of a unified solution for various scenarios, including but not limited to UL, DL and SL, contributes to the reduction of hardcore complexity and costs. It should be noted that if no conflict is incurred, embodiments in a User Equipment (UE) in the present disclosure and the characteristics of the embodiments are also applicable to a base station, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first signaling; and transmitting a first signal in a first radio resource pool, the first signal carrying a fourth bit block and a third bit block;

herein, a first bit block is associated with the first signaling; the first bit block is used to generate the third bit block, while a second bit block is used to generate the fourth bit block; at least one of the first bit block or the second bit block is used to determine a first reference number; the first bit block corresponds to a first identifier, the first identifier being either a first candidate identifier or a second candidate identifier, the first candidate identifier being different from the second candidate identifier; a way of determining the first radio resource pool depends on the first identifier.

In one embodiment, a problem to be solved in the present disclosure includes: in a case when the first node determines to multiplex the first bit block and the second bit block into a same radio resource pool to be transmitted, how to determine the same radio resource pool according to the first identifier.

In one embodiment, an advantage of the above method is to ensure the transmission performance of a high-priority HARQ-ACK.

In one embodiment, an advantage of the above method is to address the difficulties confronting the multiplexing between a HARQ-ACK being associated with DCI dynamically scheduling PDSCH and a HARQ-ACK being associated with SPS PDSCH after the introduction of various priorities (or, various service types).

In one embodiment, conditions supposed to be fulfilled for multiplexing the first bit block and the second bit block into a same radio resource pool, including those for time-domain overlapping and timeline, are all fulfilled.

In one embodiment, the first node determines to multiplex the first bit block and the second bit block in a same radio resource pool.

According to one aspect of the present disclosure, the above method is characterized in that, when the first identifier is the first candidate identifier, the first reference number is used to determine a first radio resource set, the first signaling indicating the first radio resource pool in the first radio resource pool set; when the first identifier is the second candidate identifier, the first reference number is used to determine the first radio resource pool.

According to one aspect of the present disclosure, the above method is characterized in that, the second bit block corresponds to a second identifier, the second identifier being either the first candidate identifier or the second candidate identifier, the second identifier being different from the first identifier; when the first identifier is the first candidate identifier and the second identifier is the second candidate identifier, the first reference number is used to determine a first radio resource set, the first signaling indicating the first radio resource pool in the first radio resource pool set; when the first identifier is the second candidate identifier and the second identifier is the first candidate identifier, the first reference number is used to determine the first radio resource pool.

According to one aspect of the present disclosure, the above method is characterized in that, the first reference number is a sum of numbers of bits comprised in the first bit block and in the second bit block; or, the first reference number is a sum of numbers of bits comprised in an output by the first bit block through first process and in the second bit block; or, the first reference number is a sum of numbers of bits comprised in an output by the first bit block through first process and in an output by the second bit block through second process; or, the first reference number is a sum of numbers of bits comprised in the first bit block and in an output by the second bit block through second process.

According to one aspect of the present disclosure, the above method is characterized in that, the second bit block corresponds to the first candidate identifier.

According to one aspect of the present disclosure, the above method is characterized in that, a said candidate identifier in the present disclosure refers to a Priority Index.

According to one aspect of the present disclosure, the above method is characterized in that, both the first bit block and the second bit block comprise a HARQ-ACK.

The present disclosure provides a method in a second node for wireless communications, comprising:

transmitting a first signaling;

receiving a first signal in a first radio resource pool, the first signal carrying a fourth bit block and a third bit block;

herein, a first bit block is associated with the first signaling; the first bit block is used to generate the third bit block, while a second bit block is used to generate the fourth bit block; at least one of the first bit block or the second bit block is used to determine a first reference number; the first bit block corresponds to a first identifier, the first identifier being either a first candidate identifier or a second candidate identifier, the first candidate identifier being different from the second candidate identifier; a way of determining the first radio resource pool depends on the first identifier.

According to one aspect of the present disclosure, the above method is characterized in that, when the first identifier is the first candidate identifier, the first reference number is used to determine a first radio resource set, the first signaling indicating the first radio resource pool in the first radio resource pool set; when the first identifier is the second candidate identifier, the first reference number is used to determine the first radio resource pool.

According to one aspect of the present disclosure, the above method is characterized in that, the second bit block corresponds to a second identifier, the second identifier being either the first candidate identifier or the second candidate identifier, the second identifier being different from the first identifier; when the first identifier is the first candidate identifier and the second identifier is the second candidate identifier, the first reference number is used to determine a first radio resource set, the first signaling indicating the first radio resource pool in the first radio resource pool set; when the first identifier is the second candidate identifier and the second identifier is the first candidate identifier, the first reference number is used to determine the first radio resource pool.

According to one aspect of the present disclosure, the above method is characterized in that, the first reference number is a sum of numbers of bits comprised in the first bit block and in the second bit block; or, the first reference number is a sum of numbers of bits comprised in an output by the first bit block through first process and in the second bit block; or, the first reference number is a sum of numbers of bits comprised in an output by the first bit block through first process and in an output by the second bit block through second process; or, the first reference number is a sum of numbers of bits comprised in the first bit block and in an output by the second bit block through second process.

According to one aspect of the present disclosure, the above method is characterized in that, the second bit block corresponds to the first candidate identifier.

According to one aspect of the present disclosure, the above method is characterized in that, a said candidate identifier in the present disclosure refers to a Priority Index.

According to one aspect of the present disclosure, the above method is characterized in that, both the first bit block and the second bit block comprise a HARQ-ACK.

The present disclosure provides a first node for wireless communications, comprising:

a first receiver, receiving a first signaling; and a first transmitter, transmitting a first signal in a first radio resource pool, the first signal carrying a fourth bit block and a third bit block;

herein, a first bit block is associated with the first signaling; the first bit block is used to generate the third bit block, while a second bit block is used to generate the fourth bit block; at least one of the first bit block or the second bit block is used to determine a first reference number; the first bit block corresponds to a first identifier, the first identifier being either a first candidate identifier or a second candidate identifier, the first candidate identifier being different from the second candidate identifier; a way of determining the first radio resource pool depends on the first identifier.

In one embodiment, when the first identifier is the first candidate identifier, the first reference number is used to determine a first radio resource set, the first signaling indicating the first radio resource pool in the first radio resource pool set; when the first identifier is the second candidate identifier, the first reference number is used to determine the first radio resource pool.

In one embodiment, the second bit block corresponds to a second identifier, the second identifier being either the first candidate identifier or the second candidate identifier, the second identifier being different from the first identifier; when the first identifier is the first candidate identifier and the second identifier is the second candidate identifier, the first reference number is used to determine a first radio resource set, the first signaling indicating the first radio resource pool in the first radio resource pool set; when the first identifier is the second candidate identifier and the second identifier is the first candidate identifier, the first reference number is used to determine the first radio resource pool.

In one embodiment, the first reference number is a sum of numbers of bits comprised in the first bit block and in the second bit block; or, the first reference number is a sum of numbers of bits comprised in an output by the first bit block through first process and in the second bit block; or, the first reference number is a sum of numbers of bits comprised in an output by the first bit block through first process and in an output by the second bit block through second process; or, the first reference number is a sum of numbers of bits comprised in the first bit block and in an output by the second bit block through second process.

In one embodiment, the second bit block corresponds to the first candidate identifier.

In one embodiment, a said candidate identifier in the present disclosure refers to a Priority Index.

In one embodiment, both the first bit block and the second bit block comprise a HARQ-ACK.

The present disclosure provides a second node for wireless communications, comprising:

a second transmitter, transmitting a first signaling;

a second receiver, receiving a first signal in a first radio resource pool, the first signal carrying a fourth bit block and a third bit block;

herein, a first bit block is associated with the first signaling; the first bit block is used to generate the third bit block, while a second bit block is used to generate the fourth bit block; at least one of the first bit block or the second bit block is used to determine a first reference number; the first bit block corresponds to a first identifier, the first identifier being either a first candidate identifier or a second candidate identifier, the first candidate identifier being different from the second candidate identifier; a way of determining the first radio resource pool depends on the first identifier.

In one embodiment, when the first identifier is the first candidate identifier, the first reference number is used to determine a first radio resource set, the first signaling indicating the first radio resource pool in the first radio resource pool set; when the first identifier is the second candidate identifier, the first reference number is used to determine the first radio resource pool.

In one embodiment, the second bit block corresponds to a second identifier, the second identifier being either the first candidate identifier or the second candidate identifier, the second identifier being different from the first identifier; when the first identifier is the first candidate identifier and the second identifier is the second candidate identifier, the first reference number is used to determine a first radio resource set, the first signaling indicating the first radio resource pool in the first radio resource pool set; when the first identifier is the second candidate identifier and the second identifier is the first candidate identifier, the first reference number is used to determine the first radio resource pool.

In one embodiment, the first reference number is a sum of numbers of bits comprised in the first bit block and in the second bit block; or, the first reference number is a sum of numbers of bits comprised in an output by the first bit block through first process and in the second bit block; or, the first reference number is a sum of numbers of bits comprised in an output by the first bit block through first process and in an output by the second bit block through second process; or, the first reference number is a sum of numbers of bits comprised in the first bit block and in an output by the second bit block through second process.

In one embodiment, the second bit block corresponds to the first candidate identifier.

In one embodiment, a said candidate identifier in the present disclosure refers to a Priority Index.

In one embodiment, both the first bit block and the second bit block comprise a HARQ-ACK.

In one embodiment, the method in the present disclosure has the following advantages:

ensuring transmission performance of a High-Priority HARQ-ACK;

addressing the difficulties confronting the multiplexing between a HARQ-ACK being associated with DCI dynamically scheduling PDSCH and a HARQ-ACK being associated with SPS PDSCH after the introduction of various priorities (or, various service types);

improving the reliability of communications;

being easily compatible.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
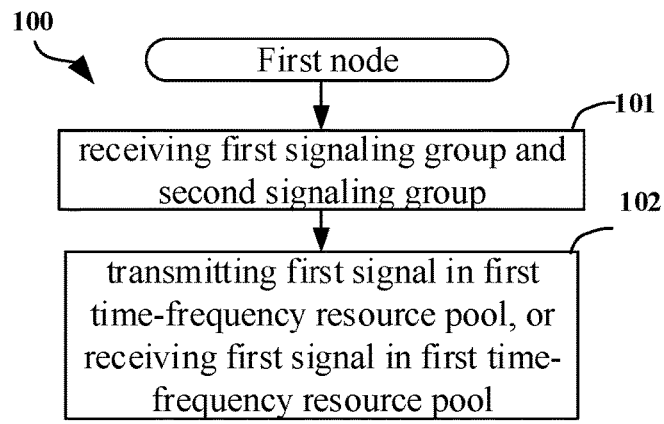
FIG. 1 illustrates a flowchart of processing of a first node according to one embodiment of the present disclosure.

Embodiment 1 illustrates a flowchart of processing of a first node, as shown in FIG. 1.

In Embodiment 1, the first node in the present disclosure receives a first signaling group and a second signaling group in step 101; and transmits a first signal in a first time-frequency resource pool, or, receives a first signal in a first time-frequency resource pool in step 102.

In Embodiment 1, the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set.

In one embodiment, a signaling in the first signaling group is dynamically configured.

In one embodiment, a signaling in the first signaling group comprises a layer 1 (L1) signaling.

In one embodiment, a signaling in the first signaling group comprises a layer 1 (L1) control signaling.

In one embodiment, a signaling in the first signaling group comprises a layer 2 (L2) signaling.

In one embodiment, a signaling in the first signaling group comprises a layer 2 (L2) control signaling.

In one embodiment, a signaling in the first signaling group comprises a layer 3 (L3) signaling.

In one embodiment, a signaling in the first signaling group comprises a layer 3 (L3) control signaling.

In one embodiment, a signaling in the first signaling group comprises a Physical Layer signaling.

In one embodiment, a signaling in the first signaling group comprises one or more fields in a physical layer signaling.

In one embodiment, a signaling in the first signaling group comprises a Higher Layer signaling.

In one embodiment, a signaling in the first signaling group comprises one or more fields in a higher layer signaling.

In one embodiment, a signaling in the first signaling group comprises a Radio Resource Control (RRC) signaling.

In one embodiment, a signaling in the first signaling group comprises a Medium Access Control layer Control Element (MAC CE) signaling.

In one embodiment, a signaling in the first signaling group comprises one or more fields in an RRC signaling.

In one embodiment, a signaling in the first signaling group comprises one or more fields in a MAC CE signaling.

In one embodiment, a signaling in the first signaling group comprises Downlink Control Information (DCI).

In one embodiment, a signaling in the first signaling group comprises one or more fields in a DCI.

In one embodiment, a signaling in the first signaling group comprises Sidelink Control Information (SCI).

In one embodiment, a signaling in the first signaling group comprises one or more fields in an SCI.

In one embodiment, a signaling in the first signaling group comprises one or more fields in an Information Element (IE).

In one embodiment, a signaling in the first signaling group is a DownLink Grant Signaling.

In one embodiment, a signaling in the first signaling group is an UpLink Gmnt Signalling.

In one embodiment, a signaling in the first signaling group is transmitted in a downlink physical layer control channel (i.e., a downlink channel only capable of bearing physical layer signaling).

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a Narrow Band PDCCH (NB-PDCCH).

In one embodiment, a signaling in the first signaling group is DCI format 1_0, for the specific definition of the DCI format 1_0, refer to 3GPP TS38.212, Chapter 7.3.1.2.

In one embodiment, a signaling in the first signaling group is DCI format 1_1, for the specific definition of the DCI format 1_1, refer to 3GPP TS38.212, Chapter 7.3.1.2.

In one embodiment, a signaling in the first signaling group is DCI format 1_2, for the specific definition of the DCI format 1_2, refer to 3GPP TS38.212, Chapter 7.3.1.2.

In one embodiment, a signaling in the first signaling group is DCI format 0_0, for the specific definition of the DCI format 0_0, refer to 3GPP TS38.212, Chapter 7.3.1.1.

In one embodiment, a signaling in the first signaling group is DCI format 0_1, for the specific definition of the DCI format 0_1, refer to 3GPP TS38.212, Chapter 7.3.1.1.

In one embodiment, a signaling in the first signaling group is DCI format 0_2, for the specific definition of the DCI format 0_2, refer to 3GPP TS38.212, Chapter 7.3.1.1.

In one embodiment, a signaling in the first signaling group comprises DCI for activating a Configured Gmnt (CG).

In one embodiment, a signaling in the first signaling group comprises DCI for activating an SPS Configuration.

In one embodiment, the first signaling group comprises one signaling.

In one embodiment, the first signaling group only comprises one signaling.

In one embodiment, the first signaling group comprises multiple signalings.

In one embodiment, a signaling in the first signaling group indicates the first index.

In one embodiment, a signaling in the second signaling group is dynamically configured.

In one embodiment, a signaling in the second signaling group comprises a layer 1 (L1) signaling.

In one embodiment, a signaling in the second signaling group comprises a layer 1 (L1) control signaling.

In one embodiment, a signaling in the second signaling group comprises a layer 2 (L2) signaling.

In one embodiment, a signaling in the second signaling group comprises a layer 2 (L2) control signaling.

In one embodiment, a signaling in the second signaling group comprises a layer 3 (L3) signaling.

In one embodiment, a signaling in the second signaling group comprises a layer 3 (L3) control signaling.

In one embodiment, a signaling in the second signaling group comprises a Physical Layer signaling.

In one embodiment, a signaling in the second signaling group comprises one or more fields in a physical layer signaling.

In one embodiment, a signaling in the second signaling group comprises a Higher Layer signaling.

In one embodiment, a signaling in the second signaling group comprises one or more fields in a higher layer signaling.

In one embodiment, a signaling in the second signaling group comprises a Radio Resource Control (RRC) signaling.

In one embodiment, a signaling in the second signaling group comprises a Medium Access Control layer Control Element (MAC CE) signaling.

In one embodiment, a signaling in the second signaling group comprises one or more fields in an RRC signaling.

In one embodiment, a signaling in the second signaling group comprises one or more fields in a MAC CE signaling.

In one embodiment, a signaling in the second signaling group comprises Downlink Control Information (DCI).

In one embodiment, a signaling in the second signaling group comprises one or more fields in a DCI.

In one embodiment, a signaling in the second signaling group comprises Sidelink Control Information (SCI).

In one embodiment, a signaling in the second signaling group comprises one or more fields in an SCI.

In one embodiment, a signaling in the second signaling group comprises one or more fields in an Information Element (IE).

In one embodiment, a signaling in the second signaling group is a DownLink Grant Signaling.

In one embodiment, a signaling in the second signaling group is an UpLink Grant Signalling.

In one embodiment, a signaling in the second signaling group is transmitted in a downlink physical layer control channel (i.e., a downlink channel only capable of bearing physical layer signaling).

In one embodiment, a signaling in the second signaling group is DCI format 1_0, for the specific definition of the DCI format 1_0, refer to 3GPP TS38.212, Chapter 7.3.1.2.

In one embodiment, a signaling in the second signaling group is DCI format 1_1, for the specific definition of the DCI format 1_1, refer to 3GPP TS38.212, Chapter 7.3.1.2.

In one embodiment, a signaling in the second signaling group is DCI format 1_2, for the specific definition of the DCI format 1_2, refer to 3GPP TS38.212, Chapter 7.3.1.2.

In one embodiment, a signaling in the second signaling group is DCI format 0_0, for the specific definition of the DCI format 0_0, refer to 3GPP TS38.212, Chapter 7.3.1.1.

In one embodiment, a signaling in the second signaling group is DCI format 0_1, for the specific definition of the DCI format 0_1, refer to 3GPP TS38.212, Chapter 7.3.1.1.

In one embodiment, a signaling in the second signaling group is DCI format 0_2, for the specific definition of the DCI format 0_2, refer to 3GPP TS38.212, Chapter 7.3.1.1.

In one embodiment, the second signaling group comprises one signaling.

In one embodiment, the second signaling group only comprises one signaling.

In one embodiment, the second signaling group comprises multiple signalings.

In one embodiment, a signaling in the second signaling group indicates the second index.

In one embodiment, the first signal comprises a radio signal.

In one embodiment, the first signal comprises a radio frequency signal.

In one embodiment, the first signal comprises a baseband signal.

In one embodiment, the first time-frequency resource pool comprises at least one Resource Element (RE) in time-frequency domain.

In one embodiment, a said RE occupies a multicarrier symbol in time domain, and a subcarrier in frequency domain.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Discrete Fourier Transform Spread OFDM (DFT-S-OFDM) symbol.

In one embodiment, the multicarrier symbol in the present disclosure is a Filter Bank Multi Carrier (FBMC) symbol.

In one embodiment, the multicarrier symbol in the present disclosure comprises a Cyclic Prefix (CP).

In one embodiment, the first time-frequency resource pool comprises a positive integer number of subcarrier(s) in frequency domain.

In one embodiment, the first time-frequency resource pool comprises a positive integer number of Physical Resource Block(s) (PRB(s)) in frequency domain.

In one embodiment, the first time-frequency resource pool comprises a positive integer number of Resource Block(s) (RB(s)) in frequency domain.

In one embodiment, the first time-frequency resource pool comprises a positive integer number of multicarrier symbol(s) in time domain.

In one embodiment, the first time-frequency resource pool comprises a positive integer number of slot(s) in time domain.

In one embodiment, the first time-frequency resource pool comprises a positive integer number of sub-slot(s) in time domain.

In one embodiment, the first time-frequency resource pool comprises a positive integer number of millisecond(s) (ms) in time domain.

In one embodiment, the first time-frequency resource pool comprises a positive integer number of consecutive multi-carrier symbols in time domain.

In one embodiment, the first time-frequency resource pool comprises a positive integer number of non-consecutive slots in time domain.

In one embodiment, the first time-frequency resource pool comprises a positive integer number of consecutive slots in time domain.

In one embodiment, the first time-frequency resource pool comprises a positive integer number of sub-frame(s) in time domain.

In one embodiment, the first time-frequency resource pool is configured by a physical layer signaling.

In one embodiment, the first time-frequency resource pool is configured by a higher layer signaling.

In one embodiment, the first time-frequency resource pool is configured by a Radio Resource Control (RRC) signaling.

In one embodiment, the first time-frequency resource pool is configured by a Medium Access Control layer Control Element (MAC CE) signaling.

In one embodiment, the first time-frequency resource pool is reserved for an uplink physical layer channel.

In one embodiment, the first time-frequency resource pool comprises time-frequency resources reserved for an uplink physical layer channel.

In one embodiment, the first time-frequency resource pool comprises time-frequency resources occupied by an uplink physical layer channel.

In one embodiment, the first time-frequency resource pool is reserved for a Physical Uplink Shared CHannel (PUSCH).

In one embodiment, the first time-frequency resource pool is reserved for a downlink physical layer channel.

In one embodiment, the first time-frequency resource pool comprises time-frequency resources reserved for a downlink physical layer channel.

In one embodiment, the first time-frequency resource pool comprises time-frequency resources occupied by a downlink physical layer channel.

In one embodiment, the first time-frequency resource pool is reserved for a Physical Downlink Shared CHannel (PDSCH).

In one embodiment, the first time-frequency resource pool is reserved for a Shared Channel.

In one embodiment, the first time-frequency resource pool belongs to time-frequency resources defined by a CG.

In one embodiment, the first time-frequency resource pool belongs to time-frequency resources defined by an SPS configuration.

In one embodiment, each signaling in the first signaling group corresponds to the first index.

In one embodiment, each signaling in the second signaling group corresponds to the second index.

In one embodiment, the first index and the second index respectively indicate different TRPs.

In one embodiment, the first index and the second index respectively indicate different Control resource sets (CORESETs).

In one embodiment, the first index and the second index respectively indicate different priorities.

In one embodiment, the first transceiver in the present disclosure comprises a receiver.

In one embodiment, the first transceiver in the present disclosure comprises the first receiver in the present disclosure.

In one embodiment, the first transceiver in the present disclosure comprises a transmitter.

In one embodiment, the first signaling group indicates the first time-frequency resource pool.

In one embodiment, all signalings in the first signaling group are signalings associated with a CG, while all signalings in the second signaling group are signalings associated with another CG.

In one embodiment, a said CG in the present disclosure comprises a semi-persistent scheduling for uplink.

In one embodiment, a said CG in the present disclosure comprises a Grant-Free scheduling for uplink.

In one embodiment, a said CG in the present disclosure is a Type 1 Configured Grant.

In one embodiment, a said CG in the present disclosure is a Type 2 Configured Grant.

In one embodiment, all signalings in the first signaling group are signalings associated with an SPS configuration, while all signalings in the second signaling group are signalings associated with another SPS configuration.

In one embodiment, the first signaling group explicitly indicates the first time-frequency resource pool.

In one embodiment, the first signaling group implicitly indicates the first time-frequency resource pool.

In one embodiment, two signalings in the first signaling group jointly indicate the first time-frequency resource pool.

In one embodiment, multiple signalings in the first signaling group jointly indicate the first time-frequency resource pool.

In one embodiment, a signaling in the first signaling group indicates the first time-frequency resource pool.

In one embodiment, a signaling in the first signaling group explicitly indicates the first time-frequency resource pool.

In one embodiment, a signaling in the first signaling group implicitly indicates the first time-frequency resource pool.

In one embodiment, a signaling in the first signaling group indicates time-domain resources occupied by the first time-frequency resource pool.

In one embodiment, a signaling in the first signaling group indicates frequency-domain resources occupied by the first time-frequency resource pool.

In one embodiment, one or more of signalings in the first signaling group indicate a first time-frequency resource pool group, with the first time-frequency resource pool being a time-frequency resource pool in the first time-frequency resource pool group.

In one embodiment, a signaling in the first signaling group indicates periodicity of the first time-frequency resource pool group.

In one embodiment, a signaling in the first signaling group indicates time-domain resources occupied by a time-frequency resource pool in the first time-frequency resource pool group.

In one embodiment, a signaling in the first signaling group indicates frequency-domain resources occupied by a time-frequency resource pool in the first time-frequency resource pool group.

In one embodiment, the second numerical value set comprises at least one numerical value.

In one embodiment, each numerical value in the second numerical value set is a non-negative integer.

In one embodiment, one numerical value in the second numerical value set corresponds to a HARQ
Process ID/number.

In one embodiment, the second signaling group indicates a second time-frequency resource pool group, and the second numerical value set comprises a HARQ Process ID/number determined by time-domain resources occupied by any time-frequency resource pool in the second time-frequency resource pool group.

In one embodiment, time-domain resources occupied by a time-frequency resource pool are: a first multicarrier symbol in the time-frequency resource pool.

In one embodiment, time-domain resources occupied by a time-frequency resource pool are: a slot to which a first multicarrier symbol in the time-frequency resource pool belongs.

In one embodiment, time-domain resources occupied by a time-frequency resource pool comprise: a first multicarrier symbol in the time-frequency resource pool.

In one embodiment, time-domain resources occupied by a time-frequency resource pool comprise: a slot to which a first multicarrier symbol in the time-frequency resource pool belongs.

In one embodiment, a HARQ process number determined by time-domain resources occupied by a time-frequency resource pool is: a HARQ process number associated with a slot to which a first multicarrier symbol in the time-domain resources occupied by the time-frequency resource pool belongs.

In one embodiment, a HARQ process number determined by time-domain resources occupied by a time-frequency resource pool is: a HARQ process number associated with a first multicarrier symbol in the time-domain resources occupied by the time-frequency resource pool.

In one embodiment, the first time-frequency resource pool group comprises at least one time-frequency resource pool.

In one embodiment, the first time-frequency resource pool group comprises the first time-frequency resource pool.

In one embodiment, the first time-frequency resource pool group is defined in a CG.

In one embodiment, the first time-frequency resource pool group is defined in an SPS configuration.

In one embodiment, the second time-frequency resource pool group comprises at least one time-frequency resource pool.

In one embodiment, the second time-frequency resource pool group comprises the second time-frequency resource pool.

In one embodiment, the second time-frequency resource pool group is defined in a CG.

In one embodiment, the second time-frequency resource pool group is defined in an SPS configuration.

In one embodiment, a signaling in the second signaling group indicates the second numerical value set.

In one embodiment, a signaling in the second signaling group indicates a second offset value.

In one embodiment, a signaling in the second signaling group indicates a fourth numerical value.

In one embodiment, the fourth numerical value is used to determine the second numerical value set.

In one embodiment, the second offset value is used to determine the second numerical value set.

In one embodiment, the second offset value and the fourth numerical value are jointly used to determine the second numerical value set.

In one embodiment, the second numerical value set comprises all integers between a third boundary value and a fourth boundary value, inclusive; where the third boundary value is no greater than the fourth boundary value.

In one embodiment, the third boundary value and the fourth boundary value are both non-negative integers.

In one embodiment, the second offset value is used to determine the third boundary value.

In one embodiment, the second offset value is used to determine the fourth boundary value.

In one embodiment, the fourth numerical value is used to determine the fourth boundary value.

In one embodiment, the third boundary value is equal to 0, and the fourth boundary value is equal to the fourth numerical value being subtracted by 1.

In one embodiment, the third boundary value is equal to the second offset value, and the fourth boundary value is equal to the second offset value plus the fourth numerical value being subtracted by 1.

In one embodiment, the second offset value is a non-negative integer no greater than 15.

In one embodiment, the second offset value is a non-negative integer no greater than 31.

In one embodiment, the second offset value is a non-negative integer no greater than 63.

In one embodiment, the second offset value is a non-negative integer no greater than 1023.

In one embodiment, the second offset value is configured in a SPS-Config Information Element (IE).

In one embodiment, the second offset value is configured in a ConfiguredGrantConfig IE.

In one embodiment, the second offset value is a numerical value indicated by a harq-ProcID-Offset field.

In one embodiment, the second offset value is a numerical value indicated by a harq-ProcID-Offset2 field.

In one embodiment, the fourth numerical value is a positive integer no greater than 16.

In one embodiment, the fourth numerical value is a positive integer no greater than 32.

In one embodiment, the fourth numerical value is a positive integer no greater than 64.

In one embodiment, the fourth numerical value is a positive integer no greater than 1024.

In one embodiment, the fourth numerical value is a numerical value indicated by a nrofHARQ-Processes field.

In one embodiment, the fourth numerical value is configured in a SPS-Config IE.

In one embodiment, the fourth numerical value is configured in a ConfiguredGrantConfig IE.

In one embodiment, a signaling in the second signaling group indicates a second periodical value.

In one embodiment, the second periodical value is used to determine the second numerical value.

In one embodiment, the second periodical value is a numerical value indicated by a periodicity field.

In one embodiment, time-domain resources occupied by the second time-frequency resource pool, the second periodical value and the fourth numerical value are jointly used to determine the second numerical value.

In one embodiment, time-domain resources occupied by the second time-frequency resource pool, the fourth numerical value, the second periodical value and the second offset value are jointly used to determine the second numerical value.

In one embodiment, the phrase that a second numerical value is used to determine a HARQ process number corresponding to the first signal comprises: the HARQ process number corresponding to the first signal is equal to the second numerical value.

In one embodiment, the first signaling group is used to determine a first time-frequency resource pool group, with the first time-frequency resource pool being a time-frequency resource pool in the first time-frequency resource pool group; the first numerical value set comprises HARQ process numbers assigned to physical layer channels transmitted in time-frequency resource pools in the first time-frequency resource pool group.

In one embodiment, the second signaling group is used to determine a second time-frequency resource pool group, with the second time-frequency resource pool being a time-frequency resource pool in the second time-frequency resource pool group; the second numerical value set comprises HARQ process numbers assigned to physical layer channels transmitted in time-frequency resource pools in the second time-frequency resource pool group.

In one embodiment, a said physical layer channel is a PUSCH.

In one embodiment, a said physical layer channel is a PDSCH.

In one embodiment, a said HARQ process number in the present disclosure is equal to one of integers from 0 to 15.

In one embodiment, a said HARQ process number in the present disclosure is equal to one of integers from 0 to 31.

In one embodiment, a said HARQ process number in the present disclosure is equal to one of integers from 0 to 63.

In one embodiment, a said HARQ process number in the present disclosure is equal to one of integers from 1 to 16.

In one embodiment, a said HARQ process number in the present disclosure is equal to one of integers from 1 to 32.

In one embodiment, a said HARQ process number in the present disclosure is equal to one of integers from 1 to 64.

In one embodiment, a said HARQ process number in the present disclosure is equal to a non-negative integer no greater than 1023.

In one embodiment, a said HARQ process number in the present disclosure is equal to a non-negative integer no greater than 1024.

Embodiment 2

Figure 2:
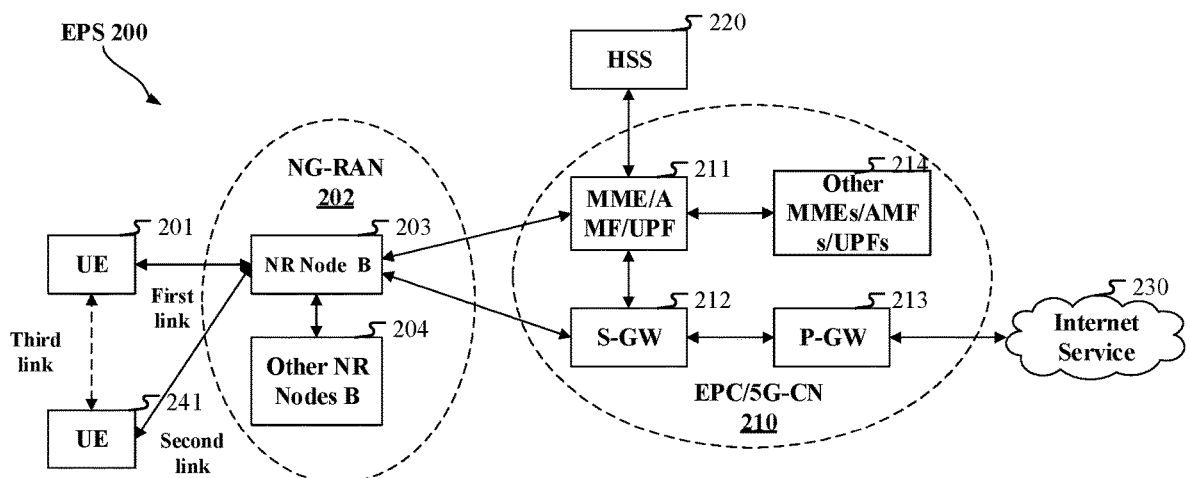
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE) and Long-Term Evolution Advanced (LIE-A) systems. The 5G NR or LIE network architecture 200 may be called an Evolved Packet System (EPS) 200 or other suitable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an SING interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the gNB 203 corresponds to the first node in the present disclosure.

In one embodiment, the gNB 203 corresponds to the second node in the present disclosure.

In one embodiment, the UE 241 corresponds to the first node in the present disclosure.

In one embodiment, the UE 201 corresponds to the second node in the present disclosure.

Embodiment 3

Figure 3:
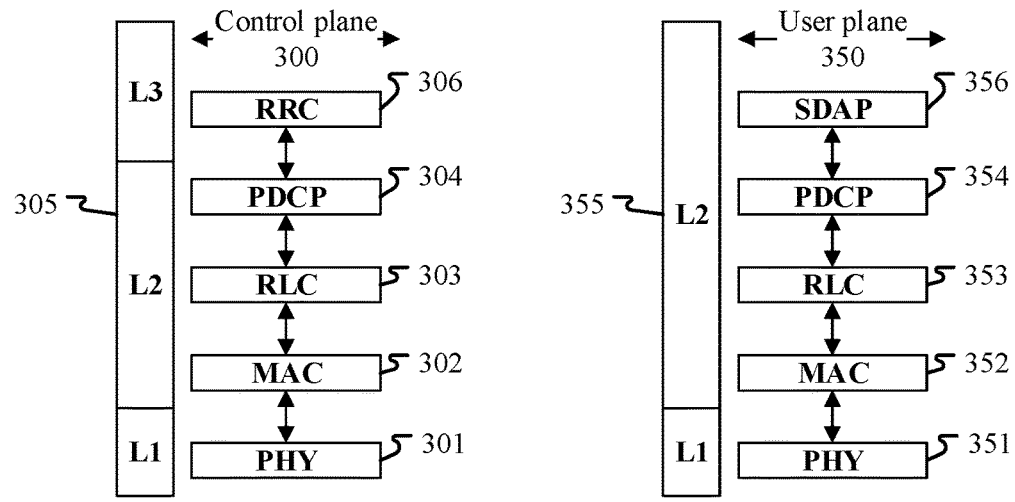
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, a signaling in the first signaling group in the present disclosure is generated by the RRC sublayer 306.

In one embodiment, a signaling in the first signaling group in the present disclosure is generated by the MAC sublayer 302.

In one embodiment, a signaling in the first signaling group in the present disclosure is generated by the MAC sublayer 352.

In one embodiment, a signaling in the first signaling group in the present disclosure is generated by the PHY 301.

In one embodiment, a signaling in the first signaling group in the present disclosure is generated by the PHY 351.

In one embodiment, a signaling in the second signaling group in the present disclosure is generated by the RRC sublayer 306.

In one embodiment, a signaling in the second signaling group in the present disclosure is generated by the MAC sublayer 302.

In one embodiment, a signaling in the second signaling group in the present disclosure is generated by the MAC sublayer 352.

In one embodiment, a signaling in the second signaling group in the present disclosure is generated by the PHY 301.

In one embodiment, a signaling in the second signaling group in the present disclosure is generated by the PHY 351.

In one embodiment, the first bit block in the present disclosure is generated by the RRC sublayer 306.

In one embodiment, the first bit block in the present disclosure is generated by the SDAP sublayer 356.

In one embodiment, the first bit block in the present disclosure is generated by the MAC sublayer 302.

In one embodiment, the first bit block in the present disclosure is generated by the MAC sublayer 352.

In one embodiment, the first bit block in the present disclosure is generated by the PHY 301.

In one embodiment, the first bit block in the present disclosure is generated by the PHY 351.

In one embodiment, the second bit block in the present disclosure is generated by the RRC sublayer 306.

In one embodiment, the second bit block in the present disclosure is generated by the SDAP sublayer 356.

In one embodiment, the second bit block in the present disclosure is generated by the MAC sublayer 302.

In one embodiment, the second bit block in the present disclosure is generated by the MAC sublayer 352.

In one embodiment, the second bit block in the present disclosure is generated by the PHY 301.

In one embodiment, the second bit block in the present disclosure is generated by the PHY 351.

In one embodiment, the first signaling in the present disclosure is generated by the RRC sublayer 306.

In one embodiment, the first signaling in the present disclosure is generated by the MAC sublayer 302.

In one embodiment, the first signaling in the present disclosure is generated by the MAC sublayer 352.

In one embodiment, the first signaling in the present disclosure is generated by the PHY 301.

In one embodiment, the first signaling in the present disclosure is generated by the PHY 351.

In one embodiment, the first signal in the present disclosure is generated by the PHY 301.

In one embodiment, the first signal in the present disclosure is generated by the PHY 351.

Embodiment 4

Figure 4:
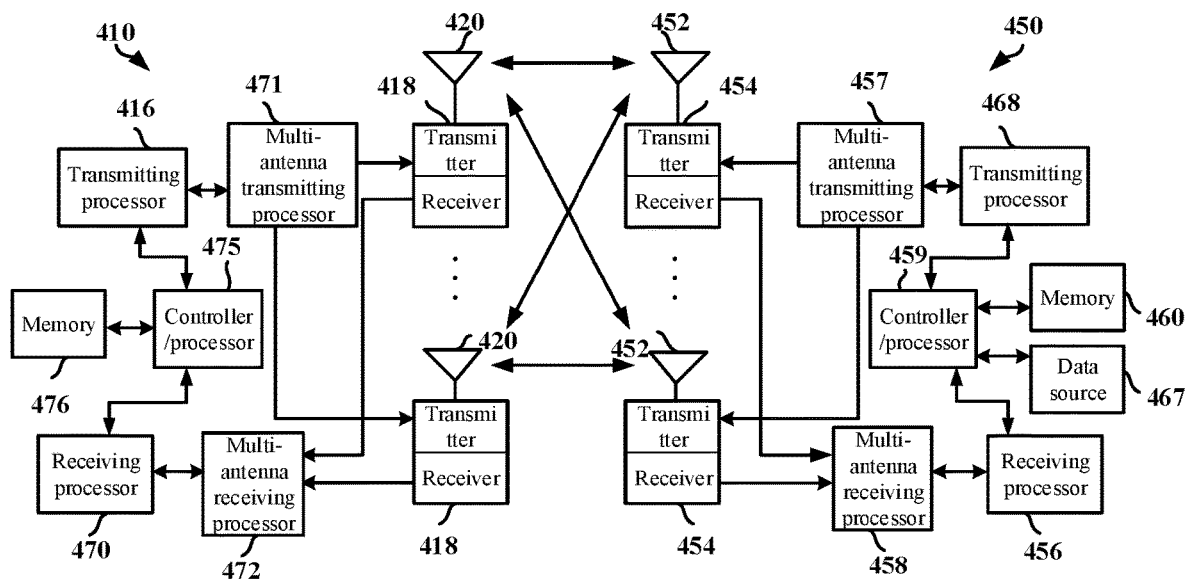
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second node is a UE, and the first node is a base station.

In one subembodiment, the second node is a relay node, and the first node is a base station.

In one subembodiment, the second communication device 450 comprises: at least one controller/processor; the at least one controller/processor is in charge of HARQ operation.

In one subembodiment, the first communication device 410 comprises: at least one controller/processor; the at least one controller/processor is in charge of HARQ operation.

In one subembodiment, the first communication device 410 comprises: at least one controller/processor; the at least one controller/processor is in charge of error detections using ACK and/or NACK protocols to support HARQ operation.

In one subembodiment, the second communication device 450 comprises: at least one controller/processor; the at least one controller/processor is in charge of error detections using ACK and/or NACK protocols to support HARQ operation.

In one embodiment, the second communication node 450 comprises at least one processor and at least one memory, the at least one memory comprises computer program codes; the at least one memory and the computer program codes are configured to be used in collaboration with the at least one processor. the second communication node 450 at least receives the first signaling group in the present disclosure and the second signaling group in the present disclosure; transmits the first signal in the present disclosure in the first time-frequency resource pool in the present disclosure, or, receives the first signal in the present disclosure in the first time-frequency resource pool in the present disclosure; herein, the first signaling group and the second signaling group respectively indicate the first index and the second index in the present disclosure, the first index being different from the second index; the first signaling group is used to determine the first time-frequency resource pool; the second signaling group is used to determine the second numerical value set in the present disclosure; the second numerical value in the present disclosure is used to determine a HARQ process number corresponding to the first signal, the second numerical value belonging to the second numerical value set.

In one subembodiment, the second communication device 450 corresponds to the first node in the present disclosure.

In one embodiment, the second communication node 450 comprises a memory that stores computer readable instruction program, the computer readable instruction program generates an action when executed by at least one processor, which includes: receiving the first signaling group in the present disclosure and the second signaling group in the present disclosure; transmitting the first signal in the present disclosure in the first time-frequency resource pool in the present disclosure, or, receiving the first signal in the present disclosure in the first time-frequency resource pool in the present disclosure; herein, the first signaling group and the second signaling group respectively indicate the first index and the second index in the present disclosure, the first index being different from the second index; the first signaling group is used to determine the first time-frequency resource pool; the second signaling group is used to determine the second numerical value set in the present disclosure; the second numerical value in the present disclosure is used to determine a HARQ process number corresponding to the first signal, the second numerical value belonging to the second numerical value set.

In one subembodiment, the second communication device 450 corresponds to the first node in the present disclosure.

In one embodiment, the first communication device 410 comprises at least one processor and at least one memory, the at least one memory comprises computer program codes; the at least one memory and the computer program codes are configured to be used in collaboration with the at least one processor. the first communication node 410 at least transmits the first signaling group in the present disclosure and the second signaling group in the present disclosure; receives the first signal in the present disclosure in the first time-frequency resource pool in the present disclosure, or, transmits the first signal in the present disclosure in the first time-frequency resource pool in the present disclosure; herein, the first signaling group and the second signaling group respectively indicate the first index and the second index in the present disclosure, the first index being different from the second index; the first signaling group is used to determine the first time-frequency resource pool; the second signaling group is used to determine the second numerical value set in the present disclosure; the second numerical value in the present disclosure is used to determine a HARQ process number corresponding to the first signal, the second numerical value belonging to the second numerical value set.

In one subembodiment, the first communication device 410 corresponds to the second node in the present disclosure.

In one embodiment, the first communication device 410 comprises a memory that stores computer readable instruction program, the computer readable instruction program generates an action when executed by at least one processor, which includes: transmitting the first signaling group in the present disclosure and the second signaling group in the present disclosure; receiving the first signal in the present disclosure in the first time-frequency resource pool in the present disclosure, or, transmitting the first signal in the present disclosure in the first time-frequency resource pool in the present disclosure; herein, the first signaling group and the second signaling group respectively indicate the first index and the second index in the present disclosure, the first index being different from the second index; the first signaling group is used to determine the first time-frequency resource pool; the second signaling group is used to determine the second numerical value set in the present disclosure; the second numerical value in the present disclosure is used to determine a HARQ process number corresponding to the first signal, the second numerical value belonging to the second numerical value set.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used for receiving the first signaling group in the present disclosure.

In one embodiment, at least one of the antenna 420, the transmitter 418, the multi-antenna transmitting processor 471, the transmitting processor 416, the controller/processor 475 or the memory 476 is used for transmitting the first signaling group in the present disclosure.

In one embodiment, at least one of the antenna 452, the receiver 454, the multi-antenna receiving processor 458, the receiving processor 456, the controller/processor 459, the memory 460, or the data source 467 is used for receiving the second signaling group in the present disclosure.

In one embodiment, at least one of the antenna 420, the transmitter 418, the multi-antenna transmitting processor 471, the transmitting processor 416, the controller/processor 475 or the memory 476 is used for transmitting the second signaling group in the present disclosure.

In one embodiment, at least one of the antenna 452, the receiver 454, the multi-antenna receiving processor 458, the receiving processor 456, the controller/processor 459, the memory 460, or the data source 467 is used for receiving the first signal in the present disclosure in the first time-frequency resource pool in the present disclosure.

In one embodiment, at least one of the antenna 420, the transmitter 418, the multi-antenna transmitting processor 471, the transmitting processor 416, the controller/processor 475 or the memory 476 is used for transmitting the first signal in the present disclosure in the first time-frequency resource pool in the present disclosure.

In one embodiment, at least one of the antenna 452, the receiver 454, the multi-antenna receiving processor 458, the receiving processor 456, the controller/processor 459, the memory 460, or the data source 467 is used for receiving the second signal in the present disclosure in the second time-frequency resource pool in the present disclosure.

In one embodiment, at least one of the antenna 420, the transmitter 418, the multi-antenna transmitting processor 471, the transmitting processor 416, the controller/processor 475 or the memory 476 is used for transmitting the second signal in the present disclosure in the second time-frequency resource pool in the present disclosure.

In one embodiment, at least one of the antenna 452, the transmitter 454, the multi-antenna transmitting processor 458, the transmitting processor 468, the controller/processor 459, the memory 460, or the data source 467 is used for transmitting the first signal in the present disclosure in the first time-frequency resource pool in the present disclosure.

In one embodiment, at least one of the antenna 420, the receiver 418, the multi-antenna receiving processor 472, the receiving processor 470, the controller/processor 475 or the memory 476 is used for receiving the first signal in the present disclosure in the first time-frequency resource pool in the present disclosure.

In one embodiment, at least one of the antenna 452, the transmitter 454, the multi-antenna transmitting processor 458, the transmitting processor 468, the controller/processor 459, the memory 460, or the data source 467 is used for transmitting the second signal in the present disclosure in the second time-frequency resource pool in the present disclosure.

In one embodiment, at least one of the antenna 420, the receiver 418, the multi-antenna receiving processor 472, the receiving processor 470, the controller/processor 475 or the memory 476 is used for receiving the second signal in the present disclosure in the second time-frequency resource pool in the present disclosure.

In one embodiment, the second communication node 450 comprises at least one processor and at least one memory, the at least one memory comprises computer program codes; the at least one memory and the computer program codes are configured to be used in collaboration with the at least one processor. the second communication node 450 at least receives the first signaling in the present disclosure; and transmits the first signal in the present disclosure in the first radio resource pool in the present disclosure, the first signal carrying the fourth bit block in the present disclosure and the third bit block in the present disclosure; herein, the first bit block in the present disclosure is associated with the first signaling; the first bit block is used to generate the third bit block, while the second bit block in the present disclosure is used to generate the fourth bit block; at least one of the first bit block or the second bit block is used to determine the first reference number in the present disclosure; the first bit block corresponds to the first identifier in the present disclosure, the first identifier being either the first candidate identifier in the present disclosure or the second candidate identifier in the present disclosure, the first candidate identifier being different from the second candidate identifier; a way of determining the first radio resource pool depends on the first identifier.

In one subembodiment, the second communication device 450 corresponds to the first node in the present disclosure.

In one embodiment, the second communication node 450 comprises a memory that stores a computer readable instruction program, the computer readable instruction program generates actions when executed by at least one processor, which include: receiving the first signaling in the present disclosure; and transmitting the first signal in the present disclosure in the first radio resource pool in the present disclosure, the first signal carrying the fourth bit block in the present disclosure and the third bit block in the present disclosure; herein, the first bit block in the present disclosure is associated with the first signaling; the first bit block is used to generate the third bit block, while the second bit block in the present disclosure is used to generate the fourth bit block; at least one of the first bit block or the second bit block is used to determine the first reference number in the present disclosure; the first bit block corresponds to the first identifier in the present disclosure, the first identifier being either the first candidate identifier in the present disclosure or the second candidate identifier in the present disclosure, the first candidate identifier being different from the second candidate identifier; a way of determining the first radio resource pool depends on the first identifier.

In one subembodiment, the second communication device 450 corresponds to the first node in the present disclosure.

In one embodiment, the first communication device 410 comprises at least one processor and at least one memory, the at least one memory comprises computer program codes; the at least one memory and the computer program codes are configured to be used in collaboration with the at least one processor. the first communication node 410 at least transmits the first signaling in the present disclosure; and receives the first signal in the present disclosure in the first radio resource pool in the present disclosure, the first signal carrying the fourth bit block in the present disclosure and the third bit block in the present disclosure; herein, the first bit block in the present disclosure is associated with the first signaling; the first bit block is used to generate the third bit block, while the second bit block in the present disclosure is used to generate the fourth bit block; at least one of the first bit block or the second bit block is used to determine the first reference number in the present disclosure; the first bit block corresponds to the first identifier in the present disclosure, the first identifier being either the first candidate identifier in the present disclosure or the second candidate identifier in the present disclosure, the first candidate identifier being different from the second candidate identifier; a way of determining the first radio resource pool depends on the first identifier.

In one subembodiment, the first communication device 410 corresponds to the second node in the present disclosure.

In one embodiment, the first communication device 410 comprises a memory that stores a computer readable instruction program, the computer readable instruction program generates actions when executed by at least one processor, which include: transmitting the first signaling in the present disclosure; and receiving the first signal in the present disclosure in the first radio resource pool in the present disclosure, the first signal carrying the fourth bit block in the present disclosure and the third bit block in the present disclosure; herein, the first bit block in the present disclosure is associated with the first signaling; the first bit block is used to generate the third bit block, while the second bit block in the present disclosure is used to generate the fourth bit block; at least one of the first bit block or the second bit block is used to determine the first reference number in the present disclosure; the first bit block corresponds to the first identifier in the present disclosure, the first identifier being either the first candidate identifier in the present disclosure or the second candidate identifier in the present disclosure, the first candidate identifier being different from the second candidate identifier; a way of determining the first radio resource pool depends on the first identifier.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used for receiving the first signaling in the present disclosure.

In one embodiment, at least one of the antenna 420, the transmitter 418, the multi-antenna transmitting processor 471, the transmitting processor 416, the controller/processor 475 or the memory 476 is used for transmitting the first signaling in the present disclosure.

In one embodiment, at least one of the antenna 452, the transmitter 454, the multi-antenna transmitting processor 458, the transmitting processor 468, the controller/processor 459, the memory 460, or the data source 467 is used for transmitting the first signal in the present disclosure in the first radio resource pool in the present disclosure.

In one embodiment, at least one of the antenna 420, the receiver 418, the multi-antenna receiving processor 472, the receiving processor 470, the controller/processor 475 or the memory 476 is used for receiving the first signal in the present disclosure in the first radio resource pool in the present disclosure.

Embodiment 5

Figure 5:
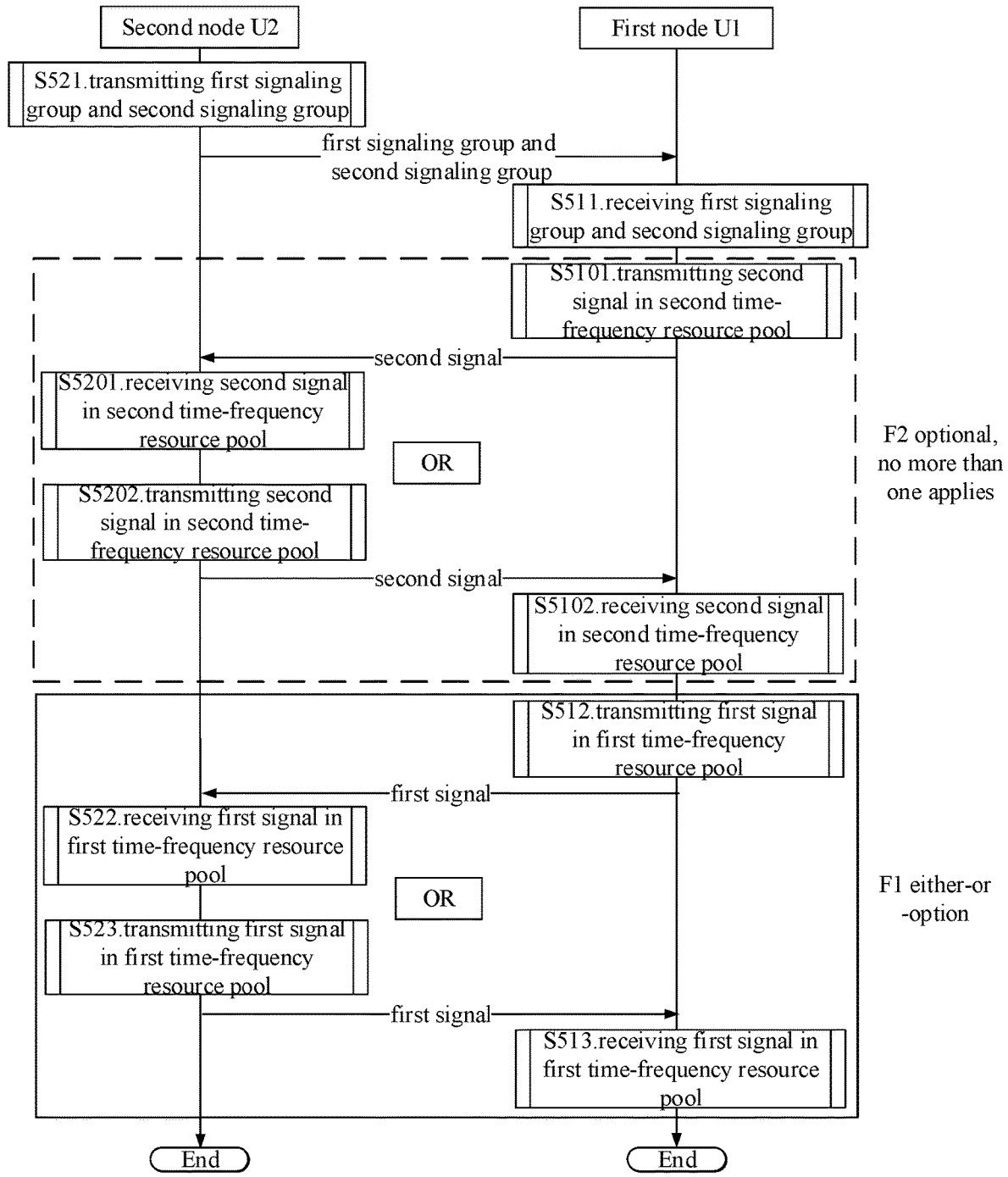
FIG. 5 illustrates a flowchart of signal transmission according to one embodiment of the present disclosure.

Embodiment 5 illustrates a flowchart of radio signal transmission according to one embodiment of the present disclosure, as shown in FIG. 5. In FIG. 5, a first node U1 and a second node U2 are in communications via an air interface. In FIG. 5, between a pair of transmitting-receiving steps {S523, S513} and a pair of transmitting-receiving steps {S512, S522} illustrated in the solid-line box F1 only one pair exists; in FIG. 5, steps marked in the dotted-line box F2 are optional, besides, between a pair of transmitting-receiving steps {S5101, S5201} and a pair of transmitting-receiving steps {S5202, S5102} no more than one exists.

The first node U1 receives a first signaling group and a second signaling group in step S511; transmits a second signal in a second time-frequency resource pool in step S5101, or, receives a second signal in a second time-frequency resource pool in step S5102; transmits a first signal in a first time-frequency resource pool in step S512, or, receives a first signal in a first time-frequency resource pool in step S513.

The second node U2 transmits a first signaling group and a second signaling group in step S521; receives a second signal in a second time-frequency resource pool in step S5201, or, transmits a second signal in a second time-frequency resource pool in step S5202; receives a first signal in a first time-frequency resource pool in step S522, or, transmits a first signal in a first time-frequency resource pool in step S523.

In Embodiment 5, the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set; the second signaling group is used to determine a second time-frequency resource pool, the first time-frequency resource pool being associated with the second time-frequency resource pool, time-domain resources occupied by the second time-frequency resource pool are used to determine the second numerical value; the first signal and the second signal both carry a first bit block, and the first time-frequency resource pool and the second time-frequency resource pool are respectively used for transmitting two repetitions of the first bit block; the second signaling group is used to determine a second time-frequency resource pool sub-group, with the second time-frequency resource pool being a time-frequency resource pool in the second time-frequency resource pool sub-group; any time-frequency resource pool in the second time-frequency resource pool sub-group corresponds to the second numerical value; a HARQ process number corresponding to the first signal is equal to the second numerical value, the first signal and the second signal corresponding to a same HARQ process number; a first multicarrier symbol occupied by the second time-frequency resource pool is used to determine the second numerical value.

In one subembodiment of Embodiment 5, the first signaling group is used to determine a first numerical value set; time-domain resources occupied by the first time-frequency resource pool are used to determine a first numerical value, the first numerical value belonging to the first numerical value set; the first numerical value and the second numerical value are associated.

In one subembodiment of Embodiment 5, first information indicates a first difference, and a difference between the first numerical value and the second numerical value is equal to the first difference.

In one embodiment, the first node U1 is the first node in the present disclosure.

In one embodiment, the second node U2 is the second node in the present disclosure.

In one embodiment, the first node U1 is a UE.

In one embodiment, the first node U1 is a base station.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 includes a cellular link.

In one embodiment, an air interface between the second node U2 and the first node U1 is a PC5 interface.

In one embodiment, an air interface between the second node U2 and the first node U1 includes a sidelink.

In one embodiment, an air interface between the second node U2 and the first node U1 includes a radio interface between a base station and a UE.

In one embodiment, an air interface between the second node U2 and the first node U1 includes a radio interface between a UE and another UE.

In one embodiment, the second transceiver in the present disclosure comprises a transmitter.

In one embodiment, the second transceiver in the present disclosure comprises the second transmitter in the present disclosure.

In one embodiment, the second transceiver in the present disclosure comprises a receiver.

In one embodiment, a HARQ process number corresponding to the first signal is equal to the second numerical value.

In one embodiment, a HARQ process number corresponding to the second signal is equal to the second numerical value.

In one embodiment, the first signal and the second signal correspond to a same HARQ process number.

In one embodiment, the first reference numerical value is the second numerical value.

In one embodiment, the first multicarrier symbol occupied by the second time-frequency resource pool is: a first multicarrier symbol in time-domain resources occupied by the second time-frequency resource pool.

In one embodiment, the first multicarrier symbol in the time-domain resources occupied by the second time-frequency resource pool is: a first multicarrier symbol occupied by the second time-frequency resource pool.

In one embodiment, the first multicarrier symbol in the time-domain resources occupied by the first time-frequency resource pool is: a first multicarrier symbol occupied by the first time-frequency resource pool.

In one embodiment, the index of the first multicarrier symbol occupied by the second time-frequency resource pool is: the current symbol number being associated with the second time-frequency resource pool.

In one embodiment, the first difference is a non-negative integer.

In one embodiment, the first difference is no greater than 7.

In one embodiment, the first difference is no greater than 15.

In one embodiment, the first difference is no greater than 31.

In one embodiment, the first difference is no greater than 63.

In one embodiment, the first difference is no greater than 1023.

In one embodiment, the first difference is indicated by an RRC signaling.

In one embodiment, the first difference is indicated by a MAC CE signaling.

In one embodiment, the issue to be solved in the present disclosure comprises: how to transmit multiple repetitions of a bit block using multiple Configured Grants (or, SPS configurations).

In one embodiment, the issue to be solved in the present disclosure comprises: how to determine a HARQ process number corresponding to transmission of a bit block when multiple Configured Grants (or, SPS configurations) are used for transmitting multiple repetitions of the bit block.

In one embodiment, the issue to be solved in the present disclosure comprises: how to determine a HARQ process number corresponding to transmission of a bit block when multiple repetitions of the bit block respectively occupy time-frequency resources determined by multiple Configured Grants (or, SPS configurations).

In one embodiment, the issue to be solved in the present disclosure comprises: how to establish associations between HARQ process numbers corresponding to multiple Configured Grants (or, SPS configurations) when the multiple Configured Grants (or, SPS configurations) are used for transmitting multiple repetitions of the bit block.

In one embodiment, characteristics of the above method comprise: the first signaling group indicates a Configured Grant, while the second signaling group indicates another Configured Grant; the first signal is transmitted in a time-frequency resource pool determined by the Configured Grant, while the other Configured Grant is used to determine a HARQ process number corresponding to the first signal.

In one embodiment, characteristics of the above method comprise: the first signaling group indicates an SPS configuration, while the second signaling group indicates another SPS configuration; the first signal is transmitted in a time-frequency resource pool determined by the SPS configuration, while the other SPS configuration is used to determine a HARQ process number corresponding to the first signal.

In one embodiment, characteristics of the above method comprise: the first signaling group indicates a Configured Grant, while the second signaling group indicates another Configured Grant; the first signal is transmitted in a PUSCH determined by the Configured Grant, while the other Configured Grant is used to determine a HARQ process number corresponding to transmission of the PUSCH.

In one embodiment, characteristics of the above method comprise: the first signaling group indicates an SPS configuration, while the second signaling group indicates another SPS configuration; the first signal is transmitted in a PDSCH determined by the SPS configuration, while the other SPS configuration is used to determine a HARQ process number corresponding to transmission of the PDSCH.

In one embodiment, characteristics of the above method comprise: two different Configured Grants are jointly used to determine a HARQ process number corresponding to the first signal.

In one embodiment, characteristics of the above method comprise: two different SPS configurations are jointly used to determine a HARQ process number corresponding to the first signal.

In one embodiment, characteristics of the above method comprise: the first signaling group and the second signaling group respectively indicate Configured Grants (or, SPS configurations) for different TRPs.

Embodiment 6

Figure 6:
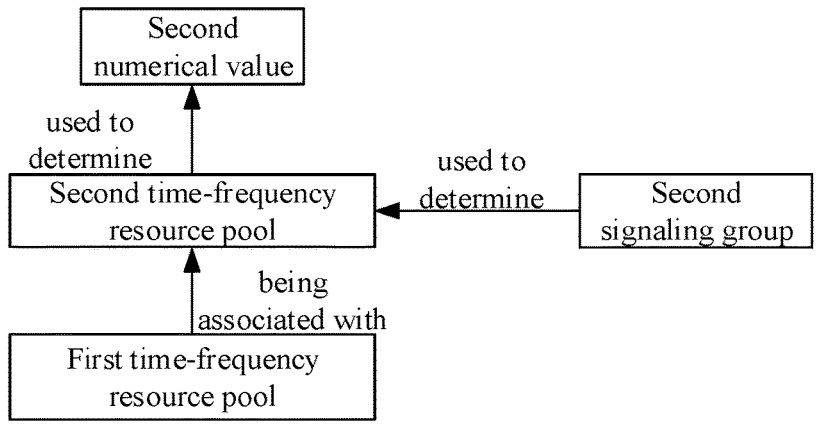
FIG. 6 illustrates a schematic diagram of relations among a second signaling group, a second time-frequency resource pool, a first time-frequency resource pool and a second numerical value according to one embodiment of the present disclosure.

Embodiment 6 illustrates a schematic diagram of relations among a second signaling group, a second time-frequency resource pool, a first time-frequency resource pool and a second numerical value according to one embodiment of the present disclosure, as shown in FIG. 6.

In Embodiment 6, the second signaling group is used to determine a second time-frequency resource pool, a first time-frequency resource pool being associated with the second time-frequency resource pool, the second time-frequency resource pool being used to determine a second numerical value.

In one embodiment, the second signaling group indicates the second time-frequency resource pool.

In one embodiment, the second signaling group explicitly indicates the second time-frequency resource pool.

In one embodiment, the second signaling group implicitly indicates the second time-frequency resource pool.

In one embodiment, two signalings in the second signaling group jointly indicate the second time-frequency resource pool.

In one embodiment, multiple signalings in the second signaling group jointly indicate the second time-frequency resource pool.

In one embodiment, a signaling in the second signaling group indicates the second time-frequency resource pool.

In one embodiment, a signaling in the second signaling group explicitly indicates the second time-frequency resource pool.

In one embodiment, a signaling in the second signaling group implicitly indicates the second time-frequency resource pool.

In one embodiment, a signaling in the second signaling group indicates time-domain resources occupied by the second time-frequency resource pool.

In one embodiment, a signaling in the second signaling group indicates frequency-domain resources occupied by the second time-frequency resource pool.

In one embodiment, one or more of signalings in the second signaling group indicates a second time-frequency resource pool group, with the second time-frequency resource pool being a time-frequency resource pool in the second time-frequency resource pool group.

In one embodiment, a signaling in the second signaling group indicates periodicity of the second time-frequency resource pool group.

In one embodiment, a signaling in the second signaling group indicates time-domain resources occupied by a time-frequency resource pool in the second time-frequency resource pool group.

In one embodiment, a signaling in the second signaling group indicates frequency-domain resources occupied by a time-frequency resource pool in the second time-frequency resource pool group.

In one embodiment, a signaling in the first signaling group indicates that the first time-frequency resource pool is associated with the second time-frequency resource pool.

In one embodiment, a signaling in the second signaling group indicates that the first time-frequency resource pool is associated with the second time-frequency resource pool.

In one embodiment, a signaling received by the first node in the present disclosure indicates that the first time-frequency resource pool is associated with the second time-frequency resource pool.

In one embodiment, the first time-frequency resource pool is associated with the second time-frequency resource pool according to a first rule of association.

In one embodiment, the first rule of association is default.

In one embodiment, the first rule of association is indicated by an RRC signaling.

In one embodiment, the first rule of association is indicated by a MAC CE signaling.

In one embodiment, the first rule of association is a rule for indicating two time-frequency resource pools belonging to different Configured Grants being associated.

In one embodiment, the first rule of association is a rule for indicating two time-frequency resource pools belonging to different SPS configurations being associated.

In one embodiment, when a time-frequency resource pool is associated with another time-frequency resource pool, the time-frequency resource pool and the other time-frequency resource pool are respectively used for two repetitions of transmission of a same bit block.

In one embodiment, when a time-frequency resource pool is associated with another time-frequency resource pool, the time-frequency resource pool and the other time-frequency resource pool can be respectively used for two repetitions of transmission of a same bit block.

In one embodiment, when a time-frequency resource pool is associated with another time-frequency resource pool, which is used for transmitting a bit block, the former time-frequency resource pool is also used for transmitting the bit block.

In one embodiment, the phrase that the first time-frequency resource pool is associated with the second time-frequency resource pool comprises: time-domain resources occupied by the first time-frequency resource pool are used to determine a first numerical value, the first numerical value being associated with the second numerical value;

In one embodiment, a first difference is used to determine association between two time-frequency resource pools.

In one embodiment, a first difference is used to determine association between two time-frequency resource pools respectively belonging to different time-frequency resource pool groups.

In one embodiment, different time-frequency resource pool groups respectively correspond to indexes of different Configured Grants.

In one embodiment, different time-frequency resource pool groups respectively correspond to indexes of different SPS configurations.

In one embodiment, time-domain resources occupied by the second time-frequency resource pool are used to determine the second numerical value.

In one embodiment, frequency-domain resources occupied by the second time-frequency resource pool are used to determine the second numerical value.

In one embodiment, time-domain resources occupied by the second time-frequency resource pool implicitly indicates the second numerical value.

In one embodiment, frequency-domain resources occupied by the second time-frequency resource pool implicitly indicates the second numerical value.

Embodiment 7

Figure 7:
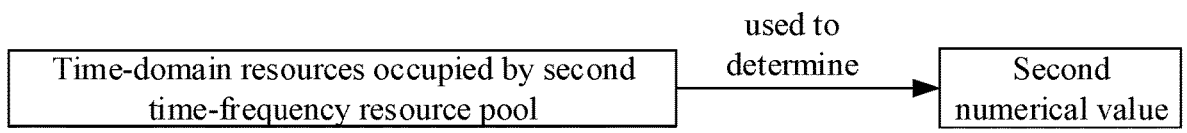
FIG. 7 illustrates a schematic diagram of a relation between time-domain resources occupied by a second time-frequency resource pool and a second numerical value according to one embodiment of the present disclosure.

Embodiment 7 illustrates a schematic diagram of a relation between time-domain resources occupied by a second time-frequency resource pool and a second numerical value according to one embodiment of the present disclosure, as shown in FIG. 7.

In Embodiment 7, time-domain resources occupied by a second time-frequency resource pool are used to determine a second numerical value.

In one embodiment, the second numerical value is equal to a second intermediate value being rounded to a nearest integer mod a fourth numerical value, that is, a result of rounding the second intermediate value to the nearest integer modulo the fourth numerical value.

In one embodiment, the second numerical value is equal to adding a second offset value based on a second intermediate value being rounded to a nearest integer mod a fourth numerical value, that is, a result of rounding the second intermediate value to the nearest integer modulo the fourth numerical value.

In one embodiment, the phrase of rounding to a nearest integer in the present disclosure includes: rounding up to a nearest integer.

In one embodiment, the phrase of rounding to a nearest integer in the present disclosure includes: rounding down to a nearest integer.

In one embodiment, the second intermediate value is equal to a current slot number associated with the second time-frequency resource pool being multiplied by 10, divided by a first constant and further divided by a second periodical value.

In one embodiment, the second intermediate value is equal to a current slot number associated with the second time-frequency resource pool being multiplied by 10, divided by {a product of a first constant and a second periodical value}.

In one embodiment, time-domain resources occupied by the second time-frequency resource pool are used to determine the current slot number associated with the second time-frequency resource pool.

In one embodiment, the current slot number associated with the second time-frequency resource pool is equal to: a second system frame number multiplied by a first constant plus a slot number corresponding to a slot, to which a first multicarrier symbol in time-domain resources occupied by the second time-frequency resource pool belongs.

In one embodiment, a said slot number in the present disclosure is a slot number in a frame.

In one embodiment, the first constant is equal to a number of slots consecutive in a frame.

In one embodiment, the first constant is indicated by a parameter of numberOfSlotsPerFrame.

In one embodiment, the second intermediate value is equal to a current symbol number associated with the second time-frequency resource pool being divided by a second periodical value.

In one embodiment, time-domain resources occupied by the second time-frequency resource pool are used to determine the current symbol number associated with the second time-frequency resource pool.

In one embodiment, the current symbol number associated with the second time-frequency resource pool is equal to: a product of a second system frame number, a first constant and a second constant being added to a product of a slot number corresponding to a slot, to which a first multicarrier symbol in time-domain resources occupied by the second time-frequency resource pool belongs, being multiplied by the second constant, plus a symbol number corresponding to the first multicarrier symbol in the time-domain resources occupied by the second time-frequency resource pool.

In one embodiment, a said symbol number in the present disclosure is a symbol number in a slot.

In one embodiment, the second constant is indicated by a parameter of numberOfSymbolsPerSlot.

In one embodiment, the second constant is equal to a number of multicarrier symbols consecutive in a slot.

In one embodiment, the second system frame number is a System Frame Number (SFN).

In one embodiment, the second system frame number refers to: a system frame number of a frame to which a first multicarrier symbol in time-domain resources occupied by the second time-frequency resource pool belongs.

Embodiment 8

Figure 8:
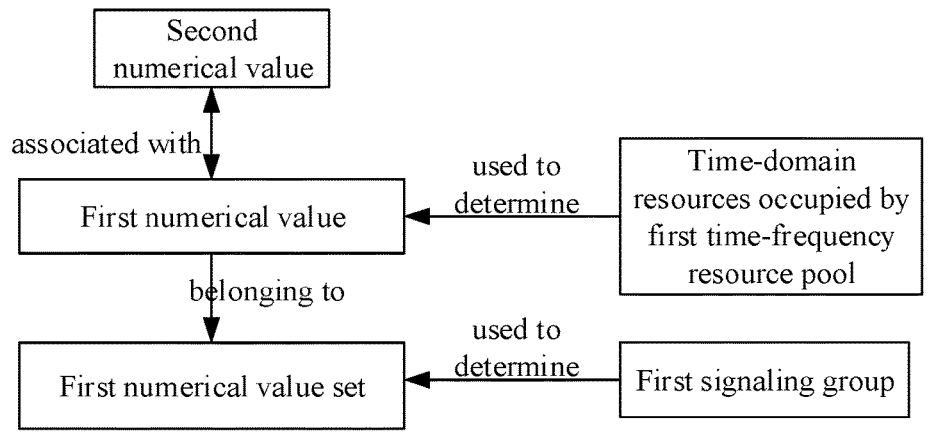
FIG. 8 illustrates a schematic diagram of relations among a first signaling group, a first numerical value set, time-domain resources occupied by a first time-frequency resource pool, a first numerical value and a second numerical value according to one embodiment of the present disclosure.

Embodiment 8 illustrates a schematic diagram of relations among a first signaling group, a first numerical value set, time-domain resources occupied by a first time-frequency resource pool, a first numerical value and a second numerical value according to one embodiment of the present disclosure, as shown in FIG. 8.

In Embodiment 8, the first signaling group is used to determine the first numerical value set; time-domain resources occupied by a first time-frequency resource pool are used to determine a first numerical value, the first numerical value belonging to the first numerical value set; the first numerical value and the second numerical value are associated.

In one embodiment, the first numerical value set comprises at least one numerical value.

In one embodiment, each numerical value in the first numerical value set is a non-negative integer.

In one embodiment, a numerical value in the first numerical value set corresponds to a HARQ process number.

In one embodiment, the first signaling group indicates a first time-frequency resource pool group, and the first numerical value set comprises a HARQ Process ID/number determined by time-domain resources occupied by any time-frequency resource pool in the first time-frequency resource pool group.

In one embodiment, the first time-frequency resource pool group comprises at least one time-frequency resource pool.

In one embodiment, the first time-frequency resource pool group comprises the first time-frequency resource pool.

In one embodiment, a signaling in the first signaling group indicates the first numerical value set.

In one embodiment, a signaling in the first signaling group indicates a first offset value.

In one embodiment, a signaling in the first signaling group indicates a third numerical value.

In one embodiment, the third numerical value is used to determine the first numerical value set.

In one embodiment, the first offset value is used to determine the first numerical value set.

In one embodiment, the first offset value and the third numerical value are jointly used to determine the first numerical value set.

In one embodiment, the first boundary value and the second boundary value are both non-negative integers.

In one embodiment, the first offset value is used to determine the first boundary value.

In one embodiment, the first offset value is used to determine the second boundary value.

In one embodiment, the third numerical value is used to determine the second boundary value.

In one embodiment, the first numerical value set comprises all integers between a first boundary value and a second boundary value, inclusive; where the first boundary value is no greater than the second boundary value.

In one embodiment, the first boundary value is equal to 0, and the second boundary value is equal to the third numerical value being subtracted by 1.

In one embodiment, the first boundary value is equal to the first offset value, and the second boundary value is equal to the first offset value plus the third numerical value being subtracted by 1.

In one embodiment, the first offset value is a non-negative integer no greater than 15.

In one embodiment, the first offset value is a non-negative integer no greater than 31.

In one embodiment, the first offset value is a non-negative integer no greater than 63.

In one embodiment, the first offset value is a non-negative integer no greater than 1023.

In one embodiment, the first offset value is a numerical value indicated by a harq-ProcID-Offset field.

In one embodiment, the first offset value is a numerical value indicated by a harq-ProcID-Offset2 field.

In one embodiment, the first offset value is configured in a SPS-Config IE.

In one embodiment, the first offset value is configured in a ConfiguredGrantConfig IE.

In one embodiment, the third numerical value is a positive integer no greater than 16.

In one embodiment, the third numerical value is a positive integer no greater than 32.

In one embodiment, the third numerical value is a positive integer no greater than 64.

In one embodiment, the third numerical value is a positive integer no greater than 1024.

In one embodiment, the third numerical value is a numerical value indicated by a nrofHARQ-Processes field.

In one embodiment, the third numerical value is configured in a SPS-Config IE.

In one embodiment, the third numerical value is configured in a ConfiguredGrantConfig IE.

In one embodiment, a signaling in the first signaling group indicates a first periodical value.

In one embodiment, the first periodical value is used to determine the first numerical value.

In one embodiment, the first periodical value is a numerical value indicated by a periodicity field.

In one embodiment, time-domain resources occupied by the first time-frequency resource pool, the first periodical value and the third numerical value are jointly used to determine the first numerical value.

In one embodiment, time-domain resources occupied by the first time-frequency resource pool, the third numerical value, the first periodical value and the first offset value are jointly used to determine the first numerical value.

In one embodiment, the phrase that the first numerical value and the second numerical value are associated comprises: the first numerical value is used to determine the second numerical value.

In one embodiment, the phrase that the first numerical value and the second numerical value are associated comprises: the second numerical value is used to determine the first numerical value.

In one embodiment, the phrase that the first numerical value and the second numerical value are associated comprises: first information indicates a first difference, and a difference of the first numerical value minus the second numerical value is equal to the first difference.

In one embodiment, the phrase that the first numerical value and the second numerical value are associated comprises: first information indicates a first difference, and a difference of the second numerical value minus the first numerical value is equal to the first difference.

In one embodiment, the phrase that the first numerical value and the second numerical value are associated comprises: first information indicates a first difference, and a difference of the first numerical value minus the second numerical value modulo a third numerical value is equal to the first difference.

In one embodiment, the phrase that the first numerical value and the second numerical value are associated comprises: first information indicates a first difference, and a difference of the first numerical value minus the second numerical value modulo a fourth numerical value is equal to the first difference.

In one embodiment, the phrase that the first numerical value and the second numerical value are associated comprises: first information indicates a first difference, and a difference of the second numerical value minus the first numerical value modulo a third numerical value is equal to the first difference.

In one embodiment, the phrase that the first numerical value and the second numerical value are associated comprises: first information indicates a first difference, and a difference of the second numerical value minus the first numerical value modulo a fourth numerical value is equal to the first difference.

In one embodiment, the first numerical value being associated with the second numerical value means: a HARQ process number corresponding to a second time-frequency resource pool is equal to the second numerical value, and the second time-frequency resource pool is a time-frequency resource pool before and nearest to the first time-frequency resource pool in a second time-frequency resource pool group. the second signaling group is used to determine the second time-frequency resource pool group.

In one embodiment, the first numerical value being associated with the second numerical value means: the first time-frequency resource pool and the second time-frequency resource pool are associated, time-domain resources occupied by the first time-frequency resource pool are used to determine the first numerical value, while time-domain resources occupied by the second time-frequency resource pool are used to determine the second numerical value.

In one embodiment, the first information is indicated by an RRC signaling.

In one embodiment, the first information is indicated by a MAC CE signaling.

In one embodiment, the first information is indicated by DCI.

In one embodiment, the first information comprises one or more fields in an RRC signaling.

In one embodiment, the first information comprises one or more fields in a MAC CE signaling.

In one embodiment, the first information comprises one or more fields in DCI.

In one embodiment, the phrase that the first numerical value and the second numerical value are associated comprises: {the first numerical value, the second numerical value} is one of a positive integer number of numerical value pair(s) which have been pre-defined.

In one embodiment, the phrase that the first numerical value and the second numerical value are associated comprises: {the second numerical value, the first numerical value} is one of a positive integer number of numerical value pair(s) which have been pre-defined.

In one embodiment, the phrase that the first numerical value and the second numerical value are associated comprises: a second rule of association is fulfilled between the first numerical value and the second numerical value.

In one embodiment, the second rule of association is pre-defined.

In one embodiment, the second rule of association is indicated by an RRC signaling.

In one embodiment, the second rule of association is indicated by a MAC CE signaling.

In one embodiment, a signaling received by the first node indicates the second rule of association.

In one embodiment, the second rule of association comprises: a rule of association used between two numerical values determined respectively based on time-domain resources occupied by two time-frequency resource pools.

In one embodiment, the second rule of association comprises: a rule of association used between two HARQ process numbers determined respectively based on time-domain resources occupied by two time-frequency resource pools.

In one embodiment, the second rule of association comprises: a rule of association used between a HARQ process number and a numerical value determined based on time-domain resources occupied by a time-frequency resource pool.

Embodiment 9

Figure 9:
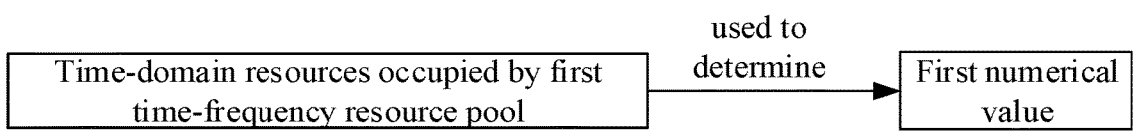
FIG. 9 illustrates a schematic diagram of a relation between time-domain resources occupied by a first time-frequency resource pool and a first numerical value according to one embodiment of the present disclosure.

Embodiment 9 illustrates a schematic diagram of a relation between time-domain resources occupied by a first time-frequency resource pool and a first numerical value according to one embodiment of the present disclosure, as shown in FIG. 9.

In Embodiment 9, time-domain resources occupied by a first time-frequency resource pool are used to determine a first numerical value.

In one embodiment, the first numerical value is equal to a first intermediate value being rounded to a nearest integer mod a third numerical value, that is, a result of rounding the first intermediate value to the nearest integer modulo the third numerical value.

In one embodiment, the first numerical value is equal to adding a first offset value based on a first intermediate value being rounded to a nearest integer mod a third numerical value, that is, a result of rounding the first intermediate value to the nearest integer modulo the third numerical value.

In one embodiment, the phrase of rounding to a nearest integer in the present disclosure includes:
rounding up to a nearest integer.

In one embodiment, the phrase of rounding to a nearest integer in the present disclosure includes: rounding down to a nearest integer.

In one embodiment, the first intermediate value is equal to a current slot number associated with the first time-frequency resource pool being multiplied by 10, divided by a first constant and further divided by a first periodical value.

In one embodiment, the first intermediate value is equal to a current slot number associated with the first time-frequency resource pool being multiplied by 10, divided by {a product of a first constant and a first periodical value}.

In one embodiment, time-domain resources occupied by the first time-frequency resource pool are used to determine the current slot number associated with the first time-frequency resource pool.

In one embodiment, the current slot number associated with the first time-frequency resource pool is equal to: a first system frame number multiplied by a first constant plus a slot number corresponding to a slot, to which a first multicarrier symbol in time-domain resources occupied by the first time-frequency resource pool belongs.

In one embodiment, the first constant is equal to a number of slots consecutive in a frame.

In one embodiment, the first constant is indicated by a parameter of numberOfSlotsPerFrame.

In one embodiment, the first intermediate value is equal to a current symbol number associated with the first time-frequency resource pool being divided by a first periodical value.

In one embodiment, time-domain resources occupied by the first time-frequency resource pool are used to determine the current symbol number associated with the first time-frequency resource pool.

In one embodiment, the current symbol number associated with the first time-frequency resource pool is equal to: a product of a first system frame number, a first constant and a second constant being added to a product of a slot number corresponding to a slot, to which a first multicarrier symbol in time-domain resources occupied by the first time-frequency resource pool belongs, being multiplied by the second constant, plus a symbol number corresponding to the first multicarrier symbol in the time-domain resources occupied by the first time-frequency resource pool.

In one embodiment, the second constant is indicated by a parameter of numberOfSymbolsPerSlot.

In one embodiment, the second constant is equal to a number of multicarrier symbols consecutive in a slot.

In one embodiment, the first system frame number is a System Frame Number (SFN).

In one embodiment, the first system frame number refers to: a system frame number of a frame to which a first multicarrier symbol in time-domain resources occupied by the first time-frequency resource pool belongs.

Embodiment 10

Figure 10:
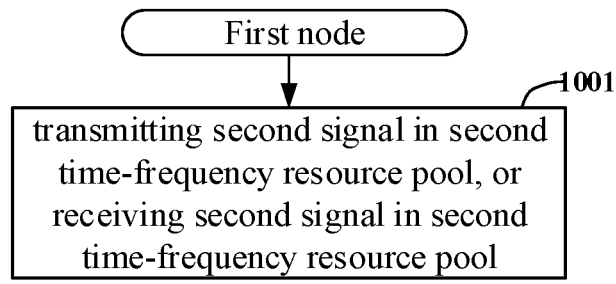
FIG. 10 illustrates a flowchart of processing of a first node on a second signal according to one embodiment of the present disclosure.

Embodiment 10 illustrates a flowchart of processing of a first node on a second signal according to one embodiment of the present disclosure, as shown in FIG. 10.

In Embodiment 10, the first node in the present disclosure transmits a second signal in a second time-frequency resource pool, or, receives a second signal in a second time-frequency resource pool; the first signal and the second signal both carry a first bit block, and the first time-frequency resource pool and the second time-frequency resource pool are respectively used for transmitting two repetitions of the first bit block.

In one subembodiment of the Embodiment 10, the second signaling group is used to determine a second time-frequency resource pool sub-group, with the second time-frequency resource pool being a time-frequency resource pool in the second time-frequency resource pool sub-group; any time-frequency resource pool in the second time-frequency resource pool sub-group corresponds to the second numerical value in the present disclosure.

In one embodiment, the second signal comprises a radio signal.

In one embodiment, the second signal comprises a radio frequency signal.

In one embodiment, the second signal comprises a baseband signal.

In one embodiment, the second time-frequency resource pool comprises at least one Resource Element (RE) in time-frequency domain.

In one embodiment, a said RE occupies a multicarrier symbol in time domain, and a subcarrier in frequency domain.

In one embodiment, the second time-frequency resource pool comprises a positive integer number of subcarrier(s) in frequency domain.

In one embodiment, the second time-frequency resource pool comprises a positive integer number of Physical Resource Block(s) (PRB(s)) in frequency domain.

In one embodiment, the second time-frequency resource pool comprises a positive integer number of Resource Block(s) (RB(s)) in frequency domain.

In one embodiment, the second time-frequency resource pool comprises a positive integer number of multicarrier symbol(s) in time domain.

In one embodiment, the second time-frequency resource pool comprises a positive integer number of slot(s) in time domain.

In one embodiment, the second time-frequency resource pool comprises a positive integer number of sub-slot(s) in time domain.

In one embodiment, the second time-frequency resource pool comprises a positive integer number of millisecond(s) (ms) in time domain.

In one embodiment, the second time-frequency resource pool comprises a positive integer number of consecutive multicarrier symbols in time domain.

In one embodiment, the second time-frequency resource pool comprises a positive integer number of non-consecutive slots in time domain.

In one embodiment, the second time-frequency resource pool comprises a positive integer number of consecutive slots in time domain.

In one embodiment, the second time-frequency resource pool comprises a positive integer number of sub-frame(s) in time domain.

In one embodiment, the second time-frequency resource pool is configured by a physical layer signaling.

In one embodiment, the second time-frequency resource pool is configured by a higher layer signaling.

In one embodiment, the second time-frequency resource pool is configured by a Radio Resource Control (RRC) signaling.

In one embodiment, the second time-frequency resource pool is configured by a Medium Access Control layer Control Element (MAC CE) signaling.

In one embodiment, the second time-frequency resource pool is reserved for an uplink physical layer channel.

In one embodiment, the second time-frequency resource pool comprises time-frequency resources reserved for an uplink physical layer channel.

In one embodiment, the second time-frequency resource pool comprises time-frequency resources occupied by an uplink physical layer channel.

In one embodiment, the second time-frequency resource pool is reserved for a Physical Uplink Shared CHannel (PUSCH).

In one embodiment, the second time-frequency resource pool is reserved for a downlink physical layer channel.

In one embodiment, the second time-frequency resource pool comprises time-frequency resources reserved for a downlink physical layer channel.

In one embodiment, the second time-frequency resource pool comprises time-frequency resources occupied by a downlink physical layer channel.

In one embodiment, the second time-frequency resource pool is reserved for a Physical Downlink Shared CHannel (PDSCH).

In one embodiment, the second time-frequency resource pool is reserved for a Shared Channel.

In one embodiment, the second time-frequency resource pool belongs to time-frequency resources defined by a CG.

In one embodiment, the second time-frequency resource pool belongs to time-frequency resources defined by an SPS configuration.

In one embodiment, the phrase that the first signal and the second signal both carry a first bit block means: the first signal comprises an output by all or part of bits in the first bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the phrase that the first signal and the second signal both carry a first bit block means: the second signal comprises an output by all or part of bits in the first bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the first bit block comprises at least one bit.

In one embodiment, the first bit block comprises one Transport Block (TB).

In one embodiment, the first bit block comprises at least one Code Block Group (CBG).

In one embodiment, the first bit block comprises at least one Code Block (CB).

In one embodiment, the second time-frequency resource pool group in the present disclosure comprises the second time-frequency resource pool sub-group.

In one embodiment, a time-frequency resource pool in the second time-frequency resource pool group in the present disclosure corresponds to a numerical value in the second numerical value set in the present disclosure.

In one embodiment, time-domain resources occupied by a time-frequency resource pool in the second time-frequency resource pool group in the present disclosure is used to determine a numerical value in the second numerical value set in the present disclosure.

In one embodiment, a numerical value in the second numerical value set determined by time-domain resources occupied by any time-frequency resource pool in the second time-frequency resource pool sub-group is the second numerical value.

In one embodiment, time-domain resources occupied by any time-frequency resource pool in the second time-frequency resource pool sub-group are used to determine the second numerical value.

In one embodiment, a HARQ process number corresponding to a signal transmitted in any time-frequency resource pool in the second time-frequency resource pool sub-group is equal to the second numerical value.

In one embodiment, the two repetitions of the first bit block adopt a same Redundancy Version (RV).

In one embodiment, the two repetitions of the first bit block respectively adopt different RVs.

In one embodiment, the first signal and the second signal respectively correspond to different TRPs.

Embodiment 11

Figure 11:
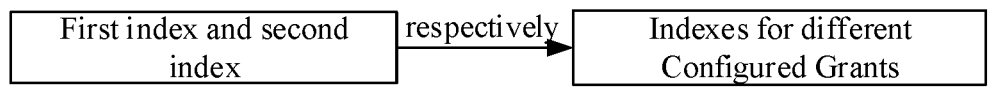
FIG. 11 illustrates a schematic diagram illustrating a first index and a second index according to one embodiment of the present disclosure.

Embodiment 11 illustrates a schematic diagram illustrating a first index and a second index according to one embodiment of the present disclosure, as shown in FIG. 11.

In Embodiment 11, a first index and a second index are respectively indexes of different Configured Grants (CGs).

In one embodiment, the first index is of a value unequal to the second index.

In one embodiment, the first index is of a value of a non-negative integer.

In one embodiment, the first index is of a value of a non-negative integer no greater than 7.

In one embodiment, the first index is of a value of a non-negative integer no greater than 15.

In one embodiment, the first index is of a value of a non-negative integer no greater than 31.

In one embodiment, the first index is of a value of a non-negative integer no greater than 1023.

In one embodiment, the second index is of a value of a non-negative integer.

In one embodiment, the second index is of a value of a non-negative integer no greater than 7.

In one embodiment, the second index is of a value of a non-negative integer no greater than 15.

In one embodiment, the second index is of a value of a non-negative integer no greater than 31.

In one embodiment, the second index is of a value of a non-negative integer no greater than 1023.

In one embodiment, the Configured Grant in the present disclosure refers to: Uplink Configured Grant.

Embodiment 12

Figure 12:
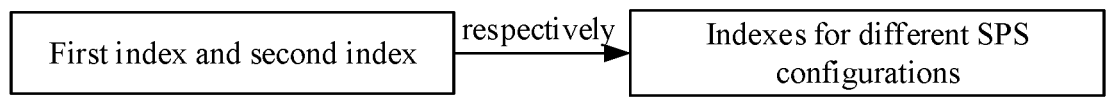
FIG. 12 illustrates a schematic diagram illustrating a first index and a second index according to one embodiment of the present disclosure.

Embodiment 12 illustrates a schematic diagram illustrating a first index and a second index according to one embodiment of the present disclosure, as shown in FIG. 12.

In Embodiment 12, a first index and a second index are respectively indexes of different Semi-Persistent Scheduling (SPS) configurations.

In one embodiment, the first index is of a value unequal to the second index.

In one embodiment, the first index is of a value of a non-negative integer.

In one embodiment, the first index is of a value of a non-negative integer no greater than 7.

In one embodiment, the first index is of a value of a non-negative integer no greater than 15.

In one embodiment, the first index is of a value of a non-negative integer no greater than 31.

In one embodiment, the first index is of a value of a non-negative integer no greater than 1023.

In one embodiment, the second index is of a value of a non-negative integer.

In one embodiment, the second index is of a value of a non-negative integer no greater than 7.

In one embodiment, the second index is of a value of a non-negative integer no greater than 15.

In one embodiment, the second index is of a value of a non-negative integer no greater than 31.

In one embodiment, the second index is of a value of a non-negative integer no greater than 1023.

In one embodiment, the SPS configuration in the present disclosure refers to: Downlink SPS Configuration.

Embodiment 13

Figure 13:
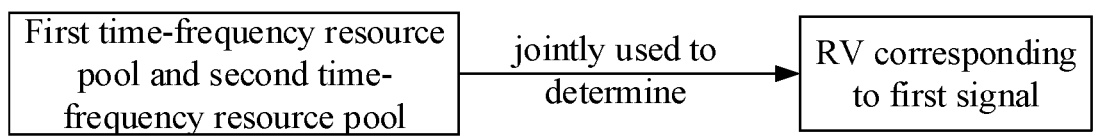
FIG. 13 illustrates a schematic diagram of relations among a first time-frequency resource pool, a second time-frequency resource pool and an RV corresponding to a first signal according to one embodiment of the present disclosure.

Embodiment 13 illustrates a schematic diagram of relations among a first time-frequency resource pool, a second time-frequency resource pool and an RV corresponding to a first signal according to one embodiment of the present disclosure, as shown in FIG. 13.

In Embodiment 13, a first time-frequency resource pool and a second time-frequency resource pool are jointly used to determine an RV corresponding to the first signal.

In one embodiment, a first multicarrier symbol in time-domain resources occupied by the first time-frequency resource pool and a first multicarrier symbol in time-domain resources occupied by the second time-frequency resource pool are jointly used to determine an RV corresponding to the first signal.

In one embodiment, an RV number of an RV corresponding to the second signal in the present disclosure is a first RV number; an RV number of an RV corresponding to the first signal is equal to a result of a third intermediate value mod 4; The third intermediate value is equal to the first RV number plus a number of multicarrier symbols between a first multicarrier symbol in time-domain resources occupied by the first time-frequency resource pool and a first multicarrier symbol in time-domain resources occupied by the second time-frequency resource pool (including the first multicarrier symbol in the time-domain resources occupied by the first time-frequency resource pool but excluding the first multicarrier symbol in the time-domain resources occupied by the second time-frequency resource pool).

In one embodiment, an RV number of an RV corresponding to the first signal is equal to a maximum value between a slot number of a first slot occupied by the first time-frequency resource pool and a slot number of a first slot occupied by the second time-frequency resource pool.

In one embodiment, an RV number of an RV corresponding to the first signal is equal to a minimum value between a slot number of a first slot occupied by the first time-frequency resource pool and a slot number of a first slot occupied by the second time-frequency resource pool.

In one embodiment, an RV number is one of 0, 1, 2 or 3.

Embodiment 14

Figure 14:
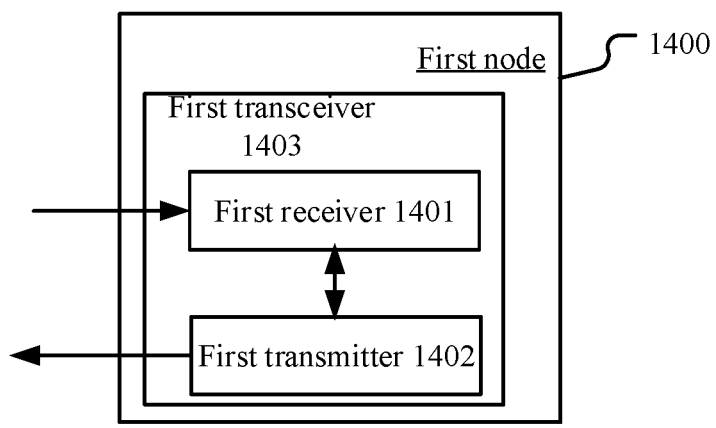
FIG. 14 illustrates a structure block diagram of a processing device in a first node according to one embodiment of the present disclosure.

Embodiment 14 illustrates a structure block diagram of a processing device in a first node, as shown in FIG. 14. In FIG. 14, a first node's processing device 1400 comprises a first transceiver 1403, the first transceiver 1403 being comprised of a first receiver 1401 and a first transmitter 1402.

In one embodiment, the first node 1400 is a UE.

In one embodiment, the first node 1400 is a relay node.

In one embodiment, the first node 1400 is vehicle-mounted communication equipment.

In one embodiment, the first node 1400 is a UE supporting V2X communications.

In one embodiment, the first node 1400 is a relay node supporting V2X communications.

In one embodiment, the first receiver 1401 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1401 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1401 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1401 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1401 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1402 comprises at least one of the antenna 452, the transmitter 454, the multi-antenna transmitting processor 457, the transmitting processor 468, the controller/processor 459 the memory 460 or the data source 467 in FIG. 4 of the present disclosure.

In one embodiment, the first transmitter 1402 comprises at least the first five of the antenna 452, the transmitter 454, the multi-antenna transmitting processor 457, the transmitting processor 468, the controller/processor 459 the memory 460 and the data source 467 in FIG. 4 of the present disclosure.

In one embodiment, the first transmitter 1402 comprises at least the first four of the antenna 452, the transmitter 454, the multi-antenna transmitting processor 457, the transmitting processor 468, the controller/processor 459 the memory 460 and the data source 467 in FIG. 4 of the present disclosure.

In one embodiment, the first transmitter 1402 comprises at least the first three of the antenna 452, the transmitter 454, the multi-antenna transmitting processor 457, the transmitting processor 468, the controller/processor 459 the memory 460 and the data source 467 in FIG. 4 of the present disclosure.

In one embodiment, the first transmitter 1402 comprises at least the first two of the antenna 452, the transmitter 454, the multi-antenna transmitting processor 457, the transmitting processor 468, the controller/processor 459 the memory 460 and the data source 467 in FIG. 4 of the present disclosure.

In Embodiment 14, the first receiver 1401 receives a first signaling group and a second signaling group; the first transceiver 1403 transmits a first signal in a first time-frequency resource pool, or, receives a first signal in a first time-frequency resource pool; herein, the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set.

In one embodiment, the second signaling group is used to determine a second time-frequency resource pool, the first time-frequency resource pool being associated with the second time-frequency resource pool, time-domain resources occupied by the second time-frequency resource pool are used to determine the second numerical value.

In one embodiment, the first signaling group is used to determine a first numerical value set; time-domain resources occupied by the first time-frequency resource pool are used to determine a first numerical value, the first numerical value belonging to the first numerical value set; the first numerical value and the second numerical value are associated.

In one embodiment, first information indicates a first difference, and a difference between the first numerical value and the second numerical value is equal to the first difference.

In one embodiment, the first transceiver 1403 transmits a second signal in a second time-frequency resource pool, or, receives a second signal in a second time-frequency resource pool; herein, the first signal and the second signal both carry a first bit block, and the first time-frequency resource pool and the second time-frequency resource pool are respectively used for transmitting two repetitions of the first bit block; the second signaling group is used to determine a second time-frequency resource pool sub-group, with the second time-frequency resource pool being a time-frequency resource pool in the second time-frequency resource pool sub-group; any time-frequency resource pool in the second time-frequency resource pool sub-group corresponds to the second numerical value.

In one embodiment, a HARQ process number corresponding to the first signal is equal to the second numerical value, the first signal and the second signal corresponding to a same HARQ process number.

In one embodiment, a first multicarrier symbol occupied by a second time-frequency resource pool is used to determine a first reference numerical value, the first reference numerical value being equal to the second numerical value.

In Embodiment 14, the first receiver 1401 receives a first signaling; the first transmitter 1402 transmits a first signal in a first radio resource pool, the first signal carrying a fourth bit block and a third bit block; herein, a first bit block is associated with the first signaling; the first bit block is used to generate the third bit block, while a second bit block is used to generate a fourth bit block; at least one of the first bit block or the second bit block is used to determine a first reference number; the first bit block corresponds to a first identifier, the first identifier being either a first candidate identifier or a second candidate identifier, the first candidate identifier being different from the second candidate identifier; a way of determining the first radio resource pool depends on the first identifier.

In one embodiment, when the first identifier is the first candidate identifier, the first reference number is used to determine a first radio resource set, the first signaling indicating the first radio resource pool in the first radio resource pool set; when the first identifier is the second candidate identifier, the first reference number is used to determine the first radio resource pool.

In one embodiment, the second bit block corresponds to a second identifier, the second identifier being either the first candidate identifier or the second candidate identifier, the second identifier being different from the first identifier; when the first identifier is the first candidate identifier and the second identifier is the second candidate identifier, the first reference number is used to determine a first radio resource set, the first signaling indicating the first radio resource pool in the first radio resource pool set; when the first identifier is the second candidate identifier and the second identifier is the first candidate identifier, the first reference number is used to determine the first radio resource pool.

In one embodiment, the first reference number is a sum of numbers of bits comprised in the first bit block and in the second bit block; or, the first reference number is a sum of numbers of bits comprised in an output by the first bit block through first process and in the second bit block; or, the first reference number is a sum of numbers of bits comprised in an output by the first bit block through first process and in an output by the second bit block through second process; or, the first reference number is a sum of numbers of bits comprised in the first bit block and in an output by the second bit block through second process.

In one embodiment, the second bit block corresponds to the first candidate identifier.

In one embodiment, a said candidate identifier in the present disclosure refers to a Priority Index.

In one embodiment, both the first bit block and the second bit block comprise a HARQ-ACK.

Embodiment 15

Figure 15:
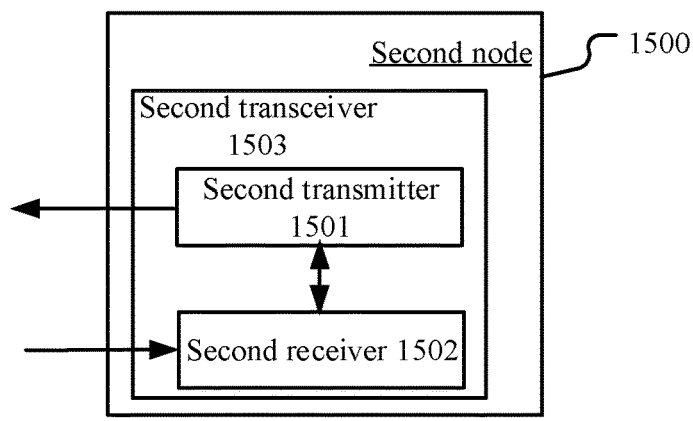
FIG. 15 illustrates a structure block diagram a processing device in a second node according to one embodiment of the present disclosure.

Embodiment 15 illustrates a structure block diagram a processing device in a second node according to one embodiment of the present disclosure, as shown in FIG. 15. In FIG. 15, a second node's processing device 1500 comprises a second transceiver 1503, the second transceiver 1503 being comprised of a second transmitter 1501 and a second receiver 1502.

In one embodiment, the second node 1500 is a UE.

In one embodiment, the second node 1500 is a base station.

In one embodiment, the second node 1500 is a relay node.

In one embodiment, the second node 1500 is vehicle-mounted communication equipment.

In one embodiment, the second node 1500 is a UE supporting V2X communications.

In one embodiment, the second transmitter 1501 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1501 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1501 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1501 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1501 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1502 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1502 comprises at least the first five of the antenna 420, the receiver 418, the multi-antenna receiving processor 472, the receiving processor 470, the controller/processor 475 and the memory 476 in FIG. 4 of the present disclosure.

In one embodiment, the second receiver 1502 comprises at least the first four of the antenna 420, the receiver 418, the multi-antenna receiving processor 472, the receiving processor 470, the controller/processor 475 and the memory 476 in FIG. 4 of the present disclosure.

In one embodiment, the second receiver 1502 comprises at least the first three of the antenna 420, the receiver 418, the multi-antenna receiving processor 472, the receiving processor 470, the controller/processor 475 and the memory 476 in FIG. 4 of the present disclosure.

In one embodiment, the second receiver 1502 comprises at least the first two of the antenna 420, the receiver 418, the multi-antenna receiving processor 472, the receiving processor 470, the controller/processor 475 and the memory 476 in FIG. 4 of the present disclosure.

In Embodiment 15, the second transmitter 1501 transmits a first signaling group and a second signaling group; the second transceiver 1503 receives a first signal in a first time-frequency resource pool, or, transmits a first signal in a first time-frequency resource pool; herein, the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set.

In one embodiment, the second signaling group is used to determine a second time-frequency resource pool, the first time-frequency resource pool being associated with the second time-frequency resource pool, time-domain resources occupied by the second time-frequency resource pool are used to determine the second numerical value.

In one embodiment, the first signaling group is used to determine a first numerical value set; time-domain resources occupied by the first time-frequency resource pool are used to determine a first numerical value, the first numerical value belonging to the first numerical value set; the first numerical value and the second numerical value are associated.

In one embodiment, first information indicates a first difference, and a difference between the first numerical value and the second numerical value is equal to the first difference.

In one embodiment, the second transceiver 1503 receives a second signal in a second time-frequency resource pool, or, transmits a second signal in a second time-frequency resource pool. herein, the first signal and the second signal both carry a first bit block, and the first time-frequency resource pool and the second time-frequency resource pool are respectively used for transmitting two repetitions of the first bit block; the second signaling group is used to determine a second time-frequency resource pool sub-group, with the second time-frequency resource pool being a time-frequency resource pool in the second time-frequency resource pool sub-group; any time-frequency resource pool in the second time-frequency resource pool sub-group corresponds to the second numerical value.

In one embodiment, a HARQ process number corresponding to the first signal is equal to the second numerical value, the first signal and the second signal corresponding to a same HARQ process number.

In one embodiment, a first multicarrier symbol occupied by a second time-frequency resource pool is used to determine a first reference numerical value, the first reference numerical value being equal to the second numerical value.

In Embodiment 15, the second transmitter 1501 transmits a first signaling; the second receiver 1502 receives a first signal in a first radio resource pool, the first signal carrying a fourth bit block and a third bit block; herein, a first bit block is associated with the first signaling; the first bit block is used to generate the third bit block, while a second bit block is used to generate a fourth bit block; at least one of the first bit block or the second bit block is used to determine a first reference number; the first bit block corresponds to a first identifier, the first identifier being either a first candidate identifier or a second candidate identifier, the first candidate identifier being different from the second candidate identifier; a way of determining the first radio resource pool depends on the first identifier.

In one embodiment, when the first identifier is the first candidate identifier, the first reference number is used to determine a first radio resource set, the first signaling indicating the first radio resource pool in the first radio resource pool set; when the first identifier is the second candidate identifier, the first reference number is used to determine the first radio resource pool.

In one embodiment, the second bit block corresponds to a second identifier, the second identifier being either the first candidate identifier or the second candidate identifier, the second identifier being different from the first identifier; when the first identifier is the first candidate identifier and the second identifier is the second candidate identifier, the first reference number is used to determine a first radio resource set, the first signaling indicating the first radio resource pool in the first radio resource pool set; when the first identifier is the second candidate identifier and the second identifier is the first candidate identifier, the first reference number is used to determine the first radio resource pool.

In one embodiment, the first reference number is a sum of numbers of bits comprised in the first bit block and in the second bit block; or, the first reference number is a sum of numbers of bits comprised in an output by the first bit block through first process and in the second bit block; or, the first reference number is a sum of numbers of bits comprised in an output by the first bit block through first process and in an output by the second bit block through second process; or, the first reference number is a sum of numbers of bits comprised in the first bit block and in an output by the second bit block through second process.

In one embodiment, the second bit block corresponds to the first candidate identifier.

In one embodiment, a said candidate identifier in the present disclosure refers to a Priority Index.

In one embodiment, both the first bit block and the second bit block comprise a HARQ-ACK.

Embodiment 16

Figure 16:
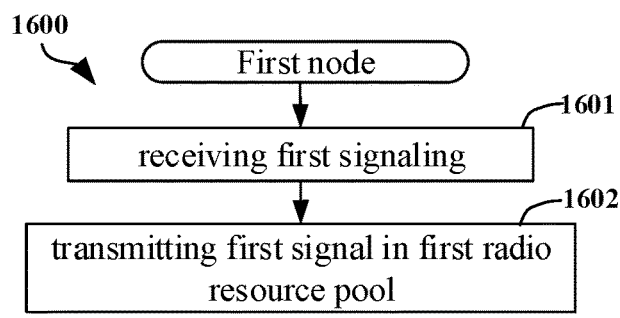
FIG. 16 illustrates a flowchart of processing of a first node according to one embodiment of the present disclosure.

Embodiment 16 illustrates a flowchart of processing of a first node according to one embodiment of the present disclosure, as shown in FIG. 16.

In Embodiment 16, the first node in the present disclosure receives a first signaling in step 1601; and transmits a first signal in a first radio resource pool in step 1602.

In Embodiment 16, the first signal carries a fourth bit block and a third bit block; a first bit block is associated with the first signaling; the first bit block is used to generate the third bit block, while a second bit block is used to generate a fourth bit block; at least one of the first bit block or the second bit block is used to determine a first reference number; the first bit block corresponds to a first identifier, the first identifier being either a first candidate identifier or a second candidate identifier, the first candidate identifier being different from the second candidate identifier; a way of determining the first radio resource pool depends on the first identifier.

In one embodiment, when the first identifier is the first candidate identifier, the first reference number is used to determine a first radio resource set, the first signaling indicating the first radio resource pool in the first radio resource pool set; when the first identifier is the second candidate identifier, the first reference number is used to determine the first radio resource pool.

In one embodiment, the second bit block corresponds to a second identifier; when the first identifier is the same as the second identifier, the first reference number is used to determine a first radio resource pool set, the first signaling indicating the first radio resource pool in the first radio resource pool set; when the first identifier is different from the second identifier, the first reference number is used to determine the first radio resource pool.

In one embodiment, the second bit block corresponds to a second identifier, the second identifier being either the first candidate identifier or the second candidate identifier, the second identifier being different from the first identifier; when the first identifier is the first candidate identifier and the second identifier is the second candidate identifier, the first reference number is used to determine a first radio resource set, the first signaling indicating the first radio resource pool in the first radio resource pool set; when the first identifier is the second candidate identifier and the second identifier is the first candidate identifier, the first reference number is used to determine the first radio resource pool.

In one embodiment, the second bit block corresponds to a second identifier, the second identifier being either the first candidate identifier or the second candidate identifier, the second identifier being different from the first identifier; when the first identifier is the second candidate identifier and the second identifier is the first candidate identifier, the first reference number is used to determine a first radio resource pool set, the first signaling indicating the first radio resource pool in the first radio resource pool set; when the first identifier is the first candidate identifier and the second identifier is the second candidate identifier, the first reference number is used to determine the first radio resource pool.

In one embodiment, the third bit block also corresponds to the first identifier.

In one embodiment, an identifier corresponding to the fourth bit block is the same as an identifier corresponding to the second bit block.

In one embodiment, the fourth bit block corresponds to the second identifier.

In one embodiment, the second identifier is the first candidate identifier.

In one embodiment, the second identifier is the second candidate identifier.

In one embodiment, the phrase that the first signal carries a fourth bit block and a third bit block means: the first signal comprises an output by all or part of bits in the fourth bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion. besides, the first signal comprises an output by all or part of bits in the third bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the phrase that the first signal carries a fourth bit block and a third bit block means: the first signal comprises an output by all or part of bits in the fourth bit block and all or part of bits in the third bit block sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the first signaling is dynamically configured.

In one embodiment, the first signaling comprises a layer 1 (L1) signaling.

In one embodiment, the first signaling comprises a layer 1 (L1) control signaling.

In one embodiment, the first signaling comprises a layer 2 (L2) signaling.

In one embodiment, the first signaling comprises a layer 2 (L2) control signaling.

In one embodiment, the first signaling comprises a layer 3 (L3) signaling.

In one embodiment, the first signaling comprises a layer 3 (L3) control signaling.

In one embodiment, the first signaling comprises a Physical Layer signaling.

In one embodiment, the first signaling comprises one or more fields in a physical layer signaling.

In one embodiment, the first signaling comprises a Higher Layer signaling.

In one embodiment, the first signaling comprises one or more fields in a Higher Layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling comprises one or more fields in an RRC signaling.

In one embodiment, the first signaling comprises one or more fields in a MAC CE signaling.

In one embodiment, the first signaling comprises Downlink Control Information (DCI).

In one embodiment, the first signaling comprises one or more fields in a DCI.

In one embodiment, the first signaling comprises Sidelink Control Information (SCI).

In one embodiment, the first signaling comprises one or more fields in an SCI.

In one embodiment, the first signaling comprises one or more fields in an Information Element (IE).

In one embodiment, the first signaling is a DownLink Grant Signaling.

In one embodiment, the first signaling is an UpLink Grant Signaling.

In one embodiment, the first signaling is transmitted in a downlink physical layer control channel (i.e., a downlink channel only capable of bearing physical layer signaling).

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a Narrow Band PDCCH (NB-PDCCH).

In one embodiment, the first signaling is DCI format 1_0, for the specific definition of the DCI format 1_0, refer to 3GPP TS38.212, Chapter 7.3.1.2.

In one embodiment, the first signaling is DCI format 1_1, for the specific definition of the DCI format 1_1, refer to 3GPP TS38.212, Chapter 7.3.1.2.

In one embodiment, the first signaling is DCI format 1_2, for the specific definition of the DCI format 1_2, refer to 3GPP TS38.212, Chapter 7.3.1.2.

In one embodiment, the first signal comprises a radio signal.

In one embodiment, the first signal comprises a radio frequency signal.

In one embodiment, the first signal comprises a baseband signal.

In one embodiment, the first radio resource pool comprises at least one Resource Element (RE) in time-frequency domain.

In one embodiment, a said RE occupies a multicarrier symbol in time domain, and a subcarrier in frequency domain.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Discrete Fourier Transform Spread OFDM (DFT-S-OFDM) symbol.

In one embodiment, the multicarrier symbol in the present disclosure is a Filter Bank Multi Carrier (FBMC) symbol.

In one embodiment, the multicarrier symbol in the present disclosure comprises a Cyclic Prefix (CP).

In one embodiment, the first radio resource pool comprises a positive integer number of subcarrier(s) in frequency domain.

In one embodiment, the first radio resource pool comprises a positive integer number of Physical Resource Block(s) (PRB(s)) in frequency domain.

In one embodiment, the first radio resource pool comprises a positive integer number of Resource Block(s) (RB(s)) in frequency domain.

In one embodiment, the first radio resource pool comprises a positive integer number of multicarrier symbol(s) in time domain.

In one embodiment, the first radio resource pool comprises a positive integer number of slot(s) in time domain.

In one embodiment, the first radio resource pool comprises a positive integer number of sub-slot(s) in time domain.

In one embodiment, the first radio resource pool comprises a positive integer number of millisecond(s) (ms) in time domain.

In one embodiment, the first radio resource pool comprises a positive integer number of consecutive multicarrier symbols in time domain.

In one embodiment, the first radio resource pool comprises a positive integer number of non-consecutive slots in time domain.

In one embodiment, the first radio resource pool comprises a positive integer number of consecutive slots in time domain.

In one embodiment, the first radio resource pool comprises a positive integer number of sub-frame(s) in time domain.

In one embodiment, the first radio resource pool is configured by a physical layer signaling.

In one embodiment, the first radio resource pool is configured by a higher layer signaling.

In one embodiment, the first radio resource pool is configured by a Radio Resource Control (RRC) signaling.

In one embodiment, the first radio resource pool is configured by a Medium Access Control layer Control Element (MAC CE) signaling.

In one embodiment, the first radio resource pool is reserved for an uplink physical layer channel.

In one embodiment, the first radio resource pool comprises time-frequency resources reserved for an uplink physical layer channel.

In one embodiment, the first radio resource pool comprises time-frequency resources occupied by an uplink physical layer channel.

In one embodiment, a said uplink physical layer channel is a PUCCH.

In one embodiment, a said uplink physical layer channel is a Physical Uplink Shared CHannel (PUSCH).

In one embodiment, the first radio resource pool is a Physical UplinkControl CHannel (PUCCH) resource.

In one embodiment, the first radio resource pool comprises a PUCCH resource.

In one embodiment, the first radio resource pool comprises a PUSCH.

In one embodiment, the first reference number indicates the first radio resource pool.

In one embodiment, the first reference number explicitly indicates the first radio resource pool.

In one embodiment, the first reference number implicitly indicates the first radio resource pool.

In one embodiment, the phrase that the first reference number is used to determine the first radio resource pool comprises: M number ranges respectively correspond to M radio resource pools, a second number range is one of the M number ranges, and the first reference number is equal to a number in the second number range; The first radio resource pool is a radio resource pool corresponding to the second number range among the M radio resource pools.

In one embodiment, a said radio resource pool set in the present disclosure comprises at least one radio resource pool.

In one embodiment, the M radio resource pools are determined by a higher layer signaling.

In one embodiment, the M radio resource pools are configured by an RRC signaling.

In one embodiment, the M radio resource pools are default.

In one embodiment, the M radio resource pools are radio resource pools configured in sps-PUCCH-AN-List-r16.

In one embodiment, the M radio resource pools are configured in an IE of which names include SPS.

In one embodiment, the M radio resource pools are all for SPS configuration.

In one embodiment, the M radio resource pools are configured in a sps-PUCCH-AN-List field.

In one embodiment, the first node is provided with SPS-PUCCH-AN-List-r16.

In one embodiment, a radio resource pool among the M radio resource pools is a PUCCH resource indicated by an item in a sps-PUCCH-AN-List.

In one embodiment, a number range among the M number ranges is determined according to configuration of a higher layer signaling.

In one embodiment, a number range among the M number ranges is determined according to configuration of an RRC layer signaling.

In one embodiment, a number range among the M number ranges is default.

In one embodiment, a number range among the M number ranges is (0, 2].

In one embodiment, a number range among the M number ranges is (2, N1, SPS].

In one embodiment, a number range among the M number ranges is (N1, SPS, N2, SPS].

In one embodiment, a number range among the M number ranges is (N2, SPS, 1706].

In one embodiment, the N1 and SPS are configured by a higher layer signaling, or, the N1 and SPS are configured by an RRC signaling, or, the N1 and SPS are equal to 1706.

In one embodiment, the N2 and SPS are configured by a higher layer signaling, or, the N2 and SPS are configured by an RRC signaling, or, the N2 and SPS are equal to 1706.

In one embodiment, M is a positive integer.

In one embodiment, M is greater than 1.

In one embodiment, M is equal to 1.

In one embodiment, M is equal to 2.

In one embodiment, M is equal to 3.

In one embodiment, M is equal to 4.

In one embodiment, M is no greater than 1024.

In one embodiment, M is configured by a higher layer signaling, or, M is configured by an RRC signaling, or, M is default.

In one embodiment, the first reference number indicates the first radio resource pool set.

In one embodiment, the first reference number explicitly indicates the first radio resource pool set.

In one embodiment, the first reference number implicitly indicates the first radio resource pool set.

In one embodiment, the phrase that the first reference number is used to determine a first radio resource pool set comprises: N number ranges respectively correspond to N radio resource pool sets, a first number range is one of the N number ranges, and the first reference number is a number in the first number range; the first radio resource pool set is a radio resource pool set corresponding to the first number range among the N radio resource pool sets.

In one embodiment, the N radio resource pool sets are determined by a higher layer signaling.

In one embodiment, the N radio resource pool sets are configured by an RRC signaling.

In one embodiment, the N radio resource pool sets are default.

In one embodiment, the N radio resource pool sets are respectively N PUCCH resource sets.

In one embodiment, the N radio resource pool sets respectively correspond to different pucch-ResourceSetIds.

In one embodiment, a pucch-ResourceSetId corresponding to a radio resource pool set among the N radio resource pool sets is equal to one of 0, 1, 2, or 3.

In one embodiment, a number range among the N number ranges is determined according to configuration of a higher layer signaling.

In one embodiment, a number range among the N number ranges is determined according to configuration of an RRC layer signaling.

In one embodiment, a number range among the N number ranges is default.

In one embodiment, a number range among the N number ranges is (0, 2].

In one embodiment, a number range among the N number ranges is (2, N2].

In one embodiment, a number range among the N number ranges is (N2, N3].

In one embodiment, a number range among the N number ranges is (N3, 1706].

In one embodiment, N2 is configured by a higher layer signaling, or, the N2 is configured by an RRC signaling, or, the N2 is equal to 1706.

In one embodiment, N3 is configured by a higher layer signaling, or, the N3 is configured by an RRC signaling, or, the N3 is equal to 1706.

In one embodiment, N is a positive integer.
In one embodiment, N is greater than 1.
In one embodiment, N is equal to 1.
In one embodiment, N is equal to 2.
In one embodiment, N is equal to 3.
In one embodiment, N is equal to 4.
In one embodiment, N is no greater than 1024.

In one embodiment, N is configured by a higher layer signaling, or, N is configured by an RRC signaling, or, N is default.

In one embodiment, the first signaling indicates an index of the first radio resource pool in the first radio resource pool set.

In one embodiment, a field comprised in the first signaling is used to indicate an index of the first radio resource pool in the first radio resource pool set.

In one embodiment, a PUCCH resource indicator field comprised in the first signaling is used to indicate the first radio resource pool in the first radio resource pool set.

In one embodiment, the first reference number is equal to a number of bits comprised in the first bit block.

In one embodiment, the first reference number is equal to a number of bits comprised in the second bit block.

In one embodiment, the first reference number is greater than a number of bits comprised in the first bit block.

In one embodiment, the first reference number is greater than a number of bits comprised in the second bit block.

In one embodiment, the first reference number is a sum of numbers of bits comprised in the first bit block and in the second bit block.

In one embodiment, the first reference number is a sum of numbers of bits comprised in the second bit block and in the third bit block.

In one embodiment, the first reference number is a sum of numbers of bits comprised in the fourth bit block and in the third bit block.

In one embodiment, the first reference number is a sum of numbers of bits comprised in the fourth bit block and in the first bit block.

In one embodiment, the first reference number is a sum of numbers of bits comprised in the first bit block and in the second bit block; or, the first reference number is a sum of numbers of bits comprised in an output by the first bit block through first process and in the second bit block; or, the first reference number is a sum of numbers of bits comprised in an output by the first bit block through first process and in an output by the second bit block through second process; or, the first reference number is a sum of numbers of bits comprised in the first bit block and in an output by the second bit block through second process.

In one embodiment, the first reference number is a sum of numbers of bits comprised in the first bit block and in the second bit block; or, the first reference number is a sum of numbers of bits comprised in the second bit block and in the third bit block; or, the first reference number is a sum of numbers of bits comprised in the fourth bit block and in the third bit block; or, the first reference number is a sum of numbers of bits comprised in the fourth bit block and in the first bit block;

In one embodiment, the first reference number is a sum of numbers of bits comprised in the second bit block and in the third bit block; or, the first reference number is a sum of numbers of bits comprised in the fourth bit block and in the first bit block;

In one embodiment, the phrase that the first bit block is used to generate the third bit block includes a meaning that: the third bit block is the first bit block.

In one embodiment, the phrase that the first bit block is used to generate the third bit block includes a meaning that: the third bit block is an output by the first bit block through first process.

In one embodiment, the phrase that the first bit block is used to generate the third bit block includes a meaning that: the third bit block is the first bit block, or, the third bit block is an output by the first bit block through first process.

In one embodiment, a number of bits comprised in the third bit block is equal to a number of bits comprised in the first bit block.

In one embodiment, a number of bits comprised in the third bit block is no greater than a number of bits comprised in the first bit block.

In one embodiment, a number of bits comprised in the third bit block is no smaller than a number of bits comprised in the first bit block.

In one embodiment, the phrase that the second bit block is used to generate the fourth bit block includes a meaning that: the fourth bit block is the second bit block.

In one embodiment, the phrase that the second bit block is used to generate the fourth bit block includes a meaning that: the fourth bit block is an output by the second bit block through second process.

In one embodiment, the phrase that the second bit block is used to generate the fourth bit block includes a meaning that: the fourth bit block is the second bit block, or, the fourth bit block is an output by the second bit block through second process.

In one embodiment, a number of bits comprised in the fourth bit block is equal to a number of bits comprised in the second bit block.

In one embodiment, a number of bits comprised in the fourth bit block is no greater than a number of bits comprised in the second bit block.

In one embodiment, a number of bits comprised in the fourth bit block is no smaller than a number of bits comprised in the second bit block.

In one embodiment, the first process comprises one or more of logic conjunction (logic and), logic disjunction (logic or), exclusive OR (XOR), deleting bits, precoding, adding duplicate bits or zero-padding operations.

In one embodiment, the second process comprises one or more of logic conjunction (logic and), logic disjunction (logic or), exclusive OR (XOR), deleting bits, precoding, adding duplicate bits or zero-padding operations.

In one embodiment, when the first identifier is the first candidate identifier: the first reference number is a sum of numbers of bits comprised in the first bit block and in the second bit block; when the first identifier is the second candidate identifier: the first reference number is a sum of numbers of bits comprised in the first bit block and in an output by the second bit block through second process.

In one embodiment, when the first identifier is the first candidate identifier: the first reference number is a sum of numbers of bits comprised in the first bit block and in the second bit block; when the first identifier is the second candidate identifier: the first reference number is a sum of numbers of bits comprised in the second bit block and in an output by the first bit block through first process.

In one embodiment, when the first identifier is the first candidate identifier: the first reference number is a sum of numbers of bits comprised in the first bit block and in the second bit block; when the first identifier is the second candidate identifier: the first reference number is a sum of numbers of bits comprised in the second bit block and in the third bit block.

In one embodiment, when the first identifier is the first candidate identifier: The first reference number is equal to one of four elements in {a sum of numbers of bits comprised in the first bit block and in the second bit block, a sum of numbers of bits comprised in an output by the first bit block through first process and in the second bit block, a sum of numbers of bits comprised in an output by the first bit block through first process and in an output by the second bit block through second process, a sum of numbers of bits comprised in the first bit block and in an output by the second bit block through second process}; when the first identifier is the second candidate identifier: The first reference number is equal to one of four elements in {a sum of numbers of bits comprised in the first bit block and in the second bit block, a sum of numbers of bits comprised in an output by the first bit block through first process and in the second bit block, a sum of numbers of bits comprised in an output by the first bit block through first process and in an output by the second bit block through second process, a sum of numbers of bits comprised in the first bit block and in an output by the second bit block through second process}.

In one embodiment, the second bit block corresponds to a second identifier, the second identifier being either the first candidate identifier or the second candidate identifier, the second identifier being different from the first identifier; when the first identifier is the first candidate identifier and the second identifier is the second candidate identifier, the first reference number is equal to one of four elements in {a sum of numbers of bits comprised in the first bit block and in the second bit block, a sum of numbers of bits comprised in an output by the first bit block through first process and in the second bit block, a sum of numbers of bits comprised in an output by the first bit block through first process and in an output by the second bit block through second process, a sum of numbers of bits comprised in the first bit block and in an output by the second bit block through second process}; when the first identifier is the second candidate identifier and the second identifier is the first candidate identifier, the first reference number is equal to one of four elements in {a sum of numbers of bits comprised in the first bit block and in the second bit block, a sum of numbers of bits comprised in an output by the first bit block through first process and in the second bit block, a sum of numbers of bits comprised in an output by the first bit block through first process and in an output by the second bit block through second process, a sum of numbers of bits comprised in the first bit block and in an output by the second bit block through second process}.

In one embodiment, the second bit block corresponds to a second identifier, the second identifier being either the first candidate identifier or the second candidate identifier, the second identifier being different from the first identifier; when the first identifier is the second candidate identifier and the second identifier is the first candidate identifier, the first reference number is equal to one of four elements in {a sum of numbers of bits comprised in the first bit block and in the second bit block, a sum of numbers of bits comprised in an output by the first bit block through first process and in the second bit block, a sum of numbers of bits comprised in an output by the first bit block through first process and in an output by the second bit block through second process, a sum of numbers of bits comprised in the first bit block and in an output by the second bit block through second process}; when the first identifier is the first candidate identifier and the second identifier is the second candidate identifier, the first reference number is equal to one of four elements in {a sum of numbers of bits comprised in the first bit block and in the second bit block, a sum of numbers of bits comprised in an output by the first bit block through first process and in the second bit block, a sum of numbers of bits comprised in an output by the first bit block through first process and in an output by the second bit block through second process, a sum of numbers of bits comprised in the first bit block and in an output by the second bit block through second process}.

In one embodiment, the phrase that the first bit block is associated with the first signaling includes a meaning that: one or more of bits comprised in the first bit block indicates whether the first signaling is correctly received, or, one or more of bits comprised in the first bit block indicates whether a bit block scheduled by the first signaling is correctly received.

In one embodiment, the bit block scheduled by the first signaling comprises at least one TB.

In one embodiment, the bit block scheduled by the first signaling is transmitted on a physical layer channel scheduled by the first signaling.

In one embodiment, the physical layer channel includes PDSCH.

In one embodiment, the physical layer channel is a PDSCH.

In one embodiment, the phrase that the first bit block is associated with the first signaling includes a meaning that: the first bit block comprises a HARQ-ACK associated with the first signaling.

In one embodiment, the first bit block comprises at least one bit.

In one embodiment, the first bit block comprises at least one HARQ-ACK information bit.

In one embodiment, the first bit block comprises a HARQ-ACK codebook.

In one embodiment, the first bit block comprises a HARQ-ACK sub-codebook.

In one embodiment, a bit comprised in the first bit block denotes an ACK.

In one embodiment, a bit comprised in the first bit block denotes a NACK.

In one embodiment, each bit comprised in the first bit block denotes an ACK.

In one embodiment, each bit comprised in the first bit block denotes a NACK.

In one embodiment, the first bit block comprises a HARQ-ACK information bit for NIBS services.

In one embodiment, the first bit block comprises an ACK for NIBS services.

In one embodiment, the first bit block comprises a NACK for NIBS services.

In one embodiment, the first bit block comprises a HARQ-ACK information bit for multicast or broadcast services.

In one embodiment, the first bit block comprises an ACK for multicast or broadcast services.

In one embodiment, the first bit block comprises a NACK for multicast or broadcast services.

In one embodiment, the first bit block comprises UCI.

In one embodiment, the second bit block comprises at least one bit.

In one embodiment, the second bit block comprises at least one HARQ-ACK information bit.

In one embodiment, the second bit block comprises a HARQ-ACK codebook.

In one embodiment, the second bit block comprises a HARQ-ACK sub-codebook.

In one embodiment, a bit comprised in the second bit block denotes an ACK.

In one embodiment, a bit comprised in the second bit block denotes a NACK.

In one embodiment, each bit comprised in the second bit block denotes an ACK.

In one embodiment, each bit comprised in the second bit block denotes a NACK.

In one embodiment, the second bit block comprises a HARQ-ACK information bit for NIBS services.

In one embodiment, the second bit block comprises an ACK for NIBS services.

In one embodiment, the second bit block comprises a NACK for MBS services.

In one embodiment, the second bit block comprises a HARQ-ACK information bit for multicast or broadcast services.

In one embodiment, the second bit block comprises an ACK for multicast or broadcast services.

In one embodiment, the second bit block comprises a NACK for multicast or broadcast services.

In one embodiment, the second bit block comprises UCI.

In one embodiment, the second bit block comprises a HARQ-ACK for SPS PDSCH reception.

In one embodiment, the first bit block comprises: a HARQ-ACK for a PDSCH reception scheduled by a DCI, or a HARQ-ACK for an SPS PDSCH Release.

In one embodiment, the first bit block comprises: a HARQ-ACK for a dynamically scheduled PDSCH reception.

In one embodiment, the phrase that the first bit block corresponds to the first identifier means that: the first bit block comprises a HARQ-ACK associated with the first identifier.

In one embodiment, the phrase that the first bit block corresponds to the first identifier means that: the first signaling indicates the first identifier.

In one embodiment, the first signaling comprises a priority indicator field.

In one embodiment, the second bit block corresponds to the first candidate identifier.

In one embodiment, the phrase that the second bit block corresponds to the first candidate identifier means that: the second bit block comprises a HARQ-ACK associated with the first candidate identifier.

In one embodiment, the phrase that the second bit block corresponds to the first candidate identifier means that: the second bit block comprises a HARQ-ACK associated with an SPS PDSCH reception, a signaling activating an SPS to which the SPS PDSCH belongs indicates the first candidate identifier.

In one embodiment, the second bit block corresponds to the second candidate identifier.

In one embodiment, the phrase that the second bit block corresponds to the second candidate identifier means that: the second bit block comprises a HARQ-ACK associated with the second candidate identifier.

In one embodiment, the phrase that the second bit block corresponds to the second candidate identifier means that: the second bit block comprises a HARQ-ACK associated with an SPS PDSCH reception, a signaling activating an SPS to which the SPS PDSCH belongs indicates the second candidate identifier.

In one embodiment, the second bit block corresponds to the second identifier.

In one embodiment, the phrase that the second bit block corresponds to the second identifier means that: the second bit block comprises a HARQ-ACK associated with the second identifier.

In one embodiment, the phrase that the second bit block corresponds to the second identifier means that: the second bit block comprises a HARQ-ACK associated with an SPS PDSCH reception, a signaling activating an SPS to which the SPS PDSCH belongs indicates the second identifier.

In one embodiment, the first radio resource pool set comprises at least one radio resource pool.

In one embodiment, the first radio resource pool set is configured in an IE of which names include PUCCH-Config.

In one embodiment, the first radio resource pool set is configured in PUCCH-Config or PUCCH-ConfigCommon.

In one embodiment, the first radio resource pool set is not for SPS configuration.

In one embodiment, the first radio resource pool set is configured in a resourceSetToAddModList field.

In one embodiment, the first radio resource pool set comprises a PUCCH resource set.

In one embodiment, the first radio resource pool set comprises at least one PUCCH resource.

In one embodiment, the first radio resource pool is a PUCCH resource.

In one embodiment, the first radio resource pool set is comprised of multiple PUCCH resources.

In one embodiment, the first radio resource pool set is comprised of 2 PUCCH resources.

In one embodiment, the first radio resource pool set is comprised of 4 PUCCH resources.

In one embodiment, the first radio resource pool set is comprised of 8 PUCCH resources.

In one embodiment, the first radio resource pool set is comprised of 16 PUCCH resources.

In one embodiment, the first radio resource pool set comprises: one of a PUCCH resource set with a pucch-ResourceSetId equal to 0, a PUCCH resource set with a pucch-ResourceSetId equal to 1, a PUCCH resource set with a pucch-ResourceSetId equal to 2 and a PUCCH resource set with a pucch-ResourceSetId equal to 3.

In one embodiment, the first radio resource pool set is a PUCCH resource set with a pucch-ResourceSetId equal to one of 0, 1, 2 or 3.

In one embodiment, when the first radio resource pool belongs to the first radio resource pool set, the first signaling indicates an index of the first radio resource pool in the first radio resource pool set (or, a subset of the first radio resource pool set).

In one embodiment, each radio resource pool in the first radio resource pool set is configured by an RRC signaling.

In one embodiment, a said radio resource pool in the present disclosure comprises at least one Resource Element (RE) in time-frequency domain.

In one embodiment, a said radio resource pool in the present disclosure comprises a positive integer number of Physical Resource Block(s) (PRB(s)) in frequency domain.

In one embodiment, a said radio resource pool in the present disclosure comprises a positive integer number of Resource Block(s) (RB(s)) in frequency domain.

In one embodiment, a said radio resource pool in the present disclosure comprises a positive integer number of multicarrier symbol(s) in time domain.

In one embodiment, a said radio resource pool in the present disclosure comprises a positive integer number of slot(s) in time domain.

In one embodiment, a said radio resource pool in the present disclosure comprises a positive integer number of sub-slot(s) in time domain.

In one embodiment, a said radio resource pool in the present disclosure comprises a positive integer number of millisecond(s) (ms) in time domain.

In one embodiment, a said radio resource pool in the present disclosure comprises a positive integer number of consecutive multicarrier symbols in time domain.

In one embodiment, a said radio resource pool in the present disclosure comprises a positive integer number of non-consecutive slots in time domain.

In one embodiment, a said radio resource pool in the present disclosure comprises a positive integer number of consecutive slots in time domain.

In one embodiment, a said radio resource pool in the present disclosure comprises a positive integer number of sub-frame(s) in time domain.

In one embodiment, a said radio resource pool in the present disclosure is configured by a physical layer signaling.

In one embodiment, a said radio resource pool in the present disclosure is configured by a higher layer signaling.

In one embodiment, a said radio resource pool in the present disclosure is configured by a Radio Resource Control (RRC) signaling.

In one embodiment, a said radio resource pool in the present disclosure is configured by a Medium Access Control layer Control Element (MAC CE) signaling.

In one embodiment, a said radio resource pool in the present disclosure is reserved for an uplink physical layer channel.

In one embodiment, a said radio resource pool in the present disclosure comprises time-frequency resources reserved for an uplink physical layer channel.

In one embodiment, a said radio resource pool in the present disclosure comprises time-frequency resources occupied by an uplink physical layer channel.

In one embodiment, a said radio resource pool in the present disclosure is a Physical UplinkControl CHannel (PUCCH) resource.

In one embodiment, a said radio resource pool in the present disclosure comprises a PUCCH resource.

In one embodiment, a said radio resource pool in the present disclosure comprises a PUSCH.

In one embodiment, a said candidate identifier in the present disclosure refers to a Priority Index.

In one embodiment, a said identifier in the present disclosure refers to a Priority Index.

In one embodiment, the first candidate identifier and the second candidate identifiers are respectively different identifiers.

In one embodiment, the first candidate identifier and the second candidate identifiers are respectively different slot or sub-slot indexes.

In one embodiment, the first candidate identifier and the second candidate identifiers respectively correspond to different service types.

In one embodiment, the various service types comprise: Multicast and Broadcast Service(s) (MBS) and unicast services.

In one embodiment, the various service types comprise: Uplink services and sidelink services.

In one embodiment, the various service types comprise: Ultra Reliable Low Latency Communication (URLLC) and Enhanced Mobile BroadBand (eMBB) services.

In one embodiment, the various service types comprise: Unicast services and MBS.

In one embodiment, the various service types comprise: Sidelink services and uplink services.

In one embodiment, the various service types comprise: eMBB services and URLLC services.

In one embodiment, the first candidate identifier and the second candidate identifiers are respectively different priority indexes.

In one embodiment, the first candidate identifier and the second candidate identifiers respectively indicate different priorities.

In one embodiment, the first candidate identifier is a priority index 0, while the second candidate identifier is a priority index 1.

In one embodiment, the first candidate identifier is a priority index 1, while the second candidate identifier is a priority index 0.

In one embodiment, the first candidate identifier indicates High Priority, while the second candidate identifier indicates Low Priority.

In one embodiment, the first candidate identifier indicates Low Priority, while the second candidate identifier indicates High Priority.

In one embodiment, the priority indicated by the second candidate identifier is higher than that indicated by the first candidate identifier.

In one embodiment, the priority indicated by the second candidate identifier is lower than that indicated by the first candidate identifier.

Embodiment 17

Figure 17:
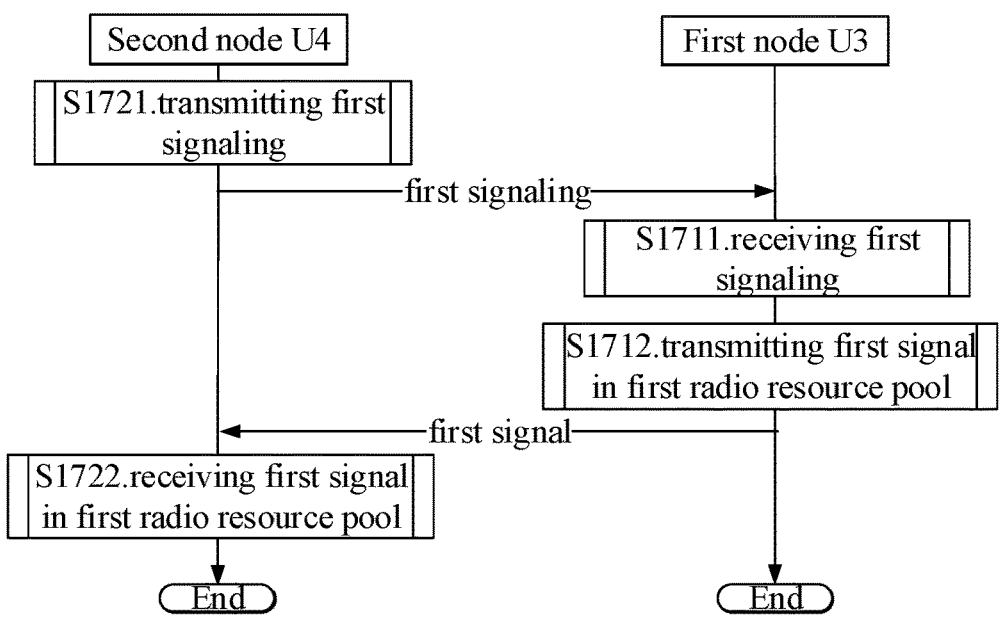
FIG. 17 illustrates a flowchart of signal transmission according to one embodiment of the present disclosure.

Embodiment 17 illustrates a flowchart of radio signal transmission according to one embodiment of the present disclosure, as shown in FIG. 17. In FIG. 17, a first node U3 and a second node U4 are in communications via an air interface.

The first node U3 receives a first signaling in step S1711; and transmits a first signal in a first radio resource pool in step S1712.

The second node U4 transmits a first signaling in step S1721; and receives a first signal in a first radio resource pool in step S1722.

In Embodiment 17, the first signal carries a fourth bit block and a third bit block; a first bit block is associated with the first signaling; the first bit block is used to generate the third bit block, while a second bit block is used to generate a fourth bit block; at least one of the first bit block or the second bit block is used to determine a first reference number; the first bit block corresponds to a first identifier, the first identifier being either a first candidate identifier or a second candidate identifier, the first candidate identifier being different from the second candidate identifier; a way of determining the first radio resource pool depends on the first identifier; the first reference number is a sum of numbers of bits comprised in the first bit block and in the second bit block; or, the first reference number is a sum of numbers of bits comprised in an output by the first bit block through first process and in the second bit block; or, the first reference number is a sum of numbers of bits comprised in an output by the first bit block through first process and in an output by the second bit block through second process; or, the first reference number is a sum of numbers of bits comprised in the first bit block and in an output by the second bit block through second process; a said candidate identifier in the present disclosure refers to a Priority Index; both the first bit block and the second bit block comprise a HARQ-ACK.

In one subembodiment of Embodiment 17, when the first identifier is the first candidate identifier, the first reference number is used to determine a first radio resource pool set, the first signaling indicating the first radio resource pool in the first radio resource pool set; when the first identifier is the second candidate identifier, the first reference number is used to determine the first radio resource pool.

In one subembodiment of Embodiment 17, the second bit block corresponds to the first candidate identifier.

In one subembodiment of Embodiment 17, the second bit block corresponds to a second identifier, the second identifier being either the first candidate identifier or the second candidate identifier, the second identifier being different from the first identifier; when the first identifier is the first candidate identifier and the second identifier is the second candidate identifier, the first reference number is used to determine a first radio resource pool set, the first signaling indicating the first radio resource pool in the first radio resource pool set; when the first identifier is the second candidate identifier and the second identifier is the first candidate identifier, the first reference number is used to determine the first radio resource pool.

In one embodiment, the first node U3 is the first node in the present disclosure.

In one embodiment, the second node U4 is the second node in the present disclosure.

In one embodiment, the first node U3 is a UE.

In one embodiment, the first node U3 is a base station.

In one embodiment, the second node U4 is a base station.

In one embodiment, the second node U4 is a UE.

In one embodiment, an air interface between the second node U4 and the first node U3 is a Uu interface.

In one embodiment, an air interface between the second node U4 and the first node U3 includes a cellular link.

In one embodiment, an air interface between the second node U4 and the first node U3 is a PC5 interface.

In one embodiment, an air interface between the second node U4 and the first node U3 includes a sidelink.

In one embodiment, an air interface between the second node U4 and the first node U3 includes a radio interface between a base station and a UE.

In one embodiment, an air interface between the second node U4 and the first node U3 includes a radio interface between a UE and another UE.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, test apparatus, test equipment or test instrument, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
    a first receiver, receiving a first signaling group and a second signaling group; and
    a first transceiver, transmitting a first signal in a first time-frequency resource pool, or, receiving a first signal in a first time-frequency resource pool;
    wherein the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a hybrid automatic repeat request (HARQ) process number corresponding to the first signal, the second numerical value belonging to the second numerical value set;
    a signaling in the second signaling group indicates time-domain resources occupied by a second time-frequency resource pool;
    the time-domain resources occupied by the second time-frequency resource pool are used to determine the second numerical value; and
    the first time-frequency resource pool is reserved for a physical uplink shared channel (PUSCH) and the second time-frequency resource pool is reserved for the PUSCH; or, the first time-frequency resource pool is reserved for a physical downlink shared channel (PDSCH) and the second time-frequency resource pool is reserved for the PDSCH.

2. The first node according to claim 1, wherein the first signaling group is used to determine a first numerical value set; time-domain resources occupied by the first time-frequency resource pool are used to determine a first numerical value, the first numerical value belonging to the first numerical value set; the first numerical value and the second numerical value are associated.

3. The first node according to claim 1, wherein the time-domain resources occupied by the second time-frequency resource pool, a second periodical value and a fourth numerical value are jointly used to determine the second numerical value; the second periodical value is a numerical value indicated by a periodicity field, the fourth numerical value is a numerical value indicated by a nrofHARQ-Processes field.

4. The first node according to claim 2, wherein first information indicates a first difference, and a difference between the first numerical value and the second numerical value is equal to the first difference.

5. The first node according to claim 4, wherein the HARQ process number corresponding to the first signal is equal to the second numerical value.

6. The first node according to claim 5, wherein a numerical value in the first numerical value set corresponds to a HARQ process number, and a numerical value in the second numerical value set corresponds to a HARQ process number.

7. The first node according to claim 6, wherein the first index and the second index respectively indicate different priorities.

8. A second node for wireless communications, comprising:
    a second transmitter, transmitting a first signaling group and a second signaling group; and
    a second transceiver, receiving a first signal in a first time-frequency resource pool, or, transmitting a first signal in a first time-frequency resource pool;
    wherein the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set;
    a signaling in the second signaling group indicates time-domain resources occupied by the second time-frequency resource pool;
    the time-domain resources occupied by the second time-frequency resource pool are used to determine the second numerical value;
    the first time-frequency resource pool is reserved for a PUSCH and the second time-frequency resource pool is reserved for the PUSCH; or, the first time-frequency resource pool is reserved for a PDSCH and the second time-frequency resource pool is reserved for a PDSCH.

9. The second node according to claim 8, wherein the first signaling group is used to determine a first numerical value set; time-domain resources occupied by the first time-frequency resource pool are used to determine a first numerical value, the first numerical value belonging to the first numerical value set; the first numerical value and the second numerical value are associated.

10. The second node according to claim 8, wherein the time-domain resources occupied by the second time-frequency resource pool, a second periodical value and a fourth numerical value are jointly used to determine the second numerical value; the second periodical value is a numerical value indicated by a periodicity field, the fourth numerical value is a numerical value indicated by a nrofHARQ-Processes field.

11. The second node according to claim 9, wherein first information indicates a first difference, and a difference between the first numerical value and the second numerical value is equal to the first difference.

12. The second node according to claim 11, wherein the HARQ process number corresponding to the first signal is equal to the second numerical value; a numerical value in the first numerical value set corresponds to a HARQ process number, and a numerical value in the second numerical value set corresponds to a HARQ process number.

13. The second node according to claim 12, wherein the first index and the second index respectively indicate different priorities.

14. A method in a first node for wireless communications, comprising:
    receiving a first signaling group and a second signaling group; and transmitting a first signal in a first time-frequency resource pool, or, receiving a first signal in a first time-frequency resource pool;

wherein the first signaling group and the second signaling group respectively indicate a first index and a second index, the first index being different from the second index; the first signaling group is used to determine the first time-frequency resource pool; the second signaling group is used to determine a second numerical value set; a second numerical value is used to determine a HARQ process number corresponding to the first signal, the second numerical value belonging to the second numerical value set;

a signaling in the second signaling group indicates time-domain resources occupied by the second time-frequency resource pool;

the time-domain resources occupied by the second time-frequency resource pool are used to determine the second numerical value; and the first time-frequency resource pool is reserved for a PUSCH and the second time-frequency resource pool is reserved for the PUSCH; or, the first time-frequency resource pool is reserved for a PDSCH, the second time-frequency resource pool is reserved for the PDSCH.

15. The method in the first node according to claim 14, wherein the first signaling group is used to determine a first numerical value set; time-domain resources occupied by the first time-frequency resource pool are used to determine a first numerical value, the first numerical value belonging to the first numerical value set; the first numerical value and the second numerical value are associated.

16. The method in the first node according to claim 4, wherein the time-domain resources occupied by the second time-frequency resource pool, a second periodical value and a fourth numerical value are jointly used to determine the second numerical value; the second periodical value is a numerical value indicated by a periodicity field, the fourth numerical value is a numerical value indicated by a nrof-HARQ-Processes field.

17. The method in the first node according to claim 5, wherein first information indicates a first difference, and a difference between the first numerical value and the second numerical value is equal to the first difference.

18. The method in the first node according to claim 17, wherein the HARQ process number corresponding to the first signal is equal to the second numerical value.

19. The method in the first node according to claim 18, wherein a numerical value in the first numerical value set corresponds to a HARQ process number, and a numerical value in the second numerical value set corresponds to a HARQ process number.

20. The method in the first node according to claim 19, wherein the first index and the second index respectively indicate different priorities.

* * * * *